US008367004B2

(12) United States Patent
Panagiotou et al.

(10) Patent No.: US 8,367,004 B2
(45) Date of Patent: Feb. 5, 2013

(54) APPARATUS AND METHODS FOR NANOPARTICLE GENERATION AND PROCESS INTENSIFICATION OF TRANSPORT AND REACTION SYSTEMS

(75) Inventors: Thomai Panagiotou, Winchester, MA (US); Steven Vincent Mesite, Bedford, MA (US); Robert John Fisher, West Roxbury, MA (US)

(73) Assignee: Microfluidics International Corporation, Newton, MA (US)

( * ) Notice: Subject to any disclaimer, the term of this patent is extended or adjusted under 35 U.S.C. 154(b) by 0 days.

(21) Appl. No.: 13/481,193

(22) Filed: May 25, 2012

(65) Prior Publication Data

US 2012/0236680 A1 Sep. 20, 2012

Related U.S. Application Data

(62) Division of application No. 12/108,245, filed on Apr. 23, 2008, now Pat. No. 8,187,554.

(51) Int. Cl.
*G05D 7/00* (2006.01)
*B01F 13/00* (2006.01)

(52) U.S. Cl. ........ 422/110; 422/111; 422/224; 422/129; 422/131; 366/162.4; 366/160.3; 366/177.1; 366/178.1

(58) Field of Classification Search .................. 422/110, 422/111, 224, 129, 131; 366/162.4, 160.3, 366/177.1, 178.1
See application file for complete search history.

(56) References Cited

U.S. PATENT DOCUMENTS

| 4,533,254 A | * | 8/1985 | Cook et al. ................. 366/176.1 |
| 4,634,134 A | | 1/1987 | Entrikin |
| 4,684,072 A | | 8/1987 | Nelson et al. |
| 4,746,069 A | | 5/1988 | Entrikin et al. |
| 4,908,154 A | | 3/1990 | Cook et al. |
| 5,314,506 A | | 5/1994 | Midler, Jr. et al. |
| 5,417,956 A | | 5/1995 | Moser |
| 5,466,646 A | | 11/1995 | Moser |
| 5,533,254 A | | 7/1996 | Gallo et al. |

(Continued)

FOREIGN PATENT DOCUMENTS

| JP | H8-117578 | 5/1996 |
| JP | H9-169026 | 6/1997 |

(Continued)

OTHER PUBLICATIONS

Gruverman, "Advances in Continuous Chemical Reactor Technology", Oct. 30, 2006, retrieved Jun. 2, 2009 from URlhttp://aimediaserver4.com/chemeng/pdf/feature-oct06.pdf, Fig. V, p. 5.

(Continued)

*Primary Examiner* — Walter D Griffin
*Assistant Examiner* — Lessanework Seifu
(74) *Attorney, Agent, or Firm* — K&L Gates LLP

(57) ABSTRACT

Apparatus, systems and methods are provided that utilize microreactor technology to achieve desired mixing and interaction at a micro and/or molecular level between and among feed stream constituents. Feed streams are fed to an intensifier pump at individually controlled rates, e.g., based on operation of individually controlled feed pumps. The time during which first and second feed streams are combined/mixed prior to introduction to the microreactor is generally minimized, thereby avoiding potential reactions and other constituent interactions prior to micro- and/or nano-scale interactions within the microreactor. Various microreactor designs/geometries may be employed, e.g., "Z" type single or multi-slot geometries and "Y" type single or multi-slot geometries. Various applications benefit from the disclosure, including emulsion, crystallization, encapsulation and reaction processes.

41 Claims, 23 Drawing Sheets

U.S. PATENT DOCUMENTS

| | | | |
|---|---|---|---|
| 5,570,955 | A | 11/1996 | Swartwout et al. |
| 5,578,279 | A | 11/1996 | Dauer et al. |
| 5,615,949 | A | 4/1997 | Morano et al. |
| 5,620,147 | A | 4/1997 | Newton |
| 5,887,974 | A | 3/1999 | Pozniak et al. |
| 6,159,442 | A | 12/2000 | Thumm et al. |
| 6,221,332 | B1 | 4/2001 | Thumm et al. |
| 6,558,435 | B2 | 5/2003 | Am Ende et al. |
| 6,607,784 | B2 | 8/2003 | Kipp et al. |
| 6,869,617 | B2 | 3/2005 | Kipp et al. |
| 6,932,914 | B2 | 8/2005 | LeClair |
| 6,960,307 | B2 | 11/2005 | LeClair |
| 6,977,085 | B2 | 12/2005 | Werling et al. |
| 7,297,288 | B1 | 11/2007 | LeClair |
| 7,326,054 | B2 | 2/2008 | Todd et al. |
| 2003/0206959 | A9 | 11/2003 | Kipp et al. |
| 2004/0266890 | A1 | 12/2004 | Kipp et al. |
| 2005/0191359 | A1 | 9/2005 | Goldshtein et al. |
| 2006/0151899 | A1 | 7/2006 | Kato et al. |
| 2007/0291581 | A1 | 12/2007 | Ehrfeld et al. |
| 2008/0038333 | A1 | 2/2008 | Magadassi et al. |
| 2009/0297565 | A1 | 12/2009 | Muller et al. |

FOREIGN PATENT DOCUMENTS

| | | |
|---|---|---|
| JP | 2002-187953 | 7/2002 |
| JP | 2003-311136 | 11/2003 |
| JP | 2006-021471 | 1/2006 |
| JP | 2006-272131 | 10/2006 |
| JP | 2006-272132 | 10/2006 |
| JP | 2006-341146 | 12/2006 |
| JP | 2008-037842 | 2/2008 |
| JP | 2008-081772 | 4/2008 |
| WO | WO 99/07466 | 2/1999 |
| WO | WO 2005/018687 | 3/2005 |
| WO | WO 2007/051520 | 5/2007 |
| WO | WO 2007/148237 | 12/2007 |

OTHER PUBLICATIONS

Johnson, et al., "Chemical Processing and Micromixing in Confined Impinging Jets", AIChE Journal, vol. 49, No. 9, Sep. 2003, pp. 2264-2282.

Sonolator Product Literature, 10 pages.

Gruverman, Breakthrough Ultraturbulent Reaction Technology Opens Frontier for Developing Life-Saving Nanometer-Scale Suspensions & Dispersions, Ultraturbulent Reaction Technology publication, Jan./Feb. 2003, vol. 3, No. 1 (4 pages).

Gruvermanm A Drug Delivery Breakthrough—Nanosuspension Formulations for Intravenous, Oral & Transdermal Administration of Active Pharmaceutical Ingredients, Nanosuspension Formulations publication, Sep. 2004, vol. 4, No. 7, pp. 58-59.

Gruverman, "Nanosuspension Preparation and Formulation", Nanosuspension Formulation publication, Sep. 2005, vol. 5, No. 8, pp. 1-4.

Gruverman, Optimizing Drug Delivery—Formulation Development and Scalaeble Manufacturing Methodology, Nanoemulsions and Nanosuspensions Prepared by Ultrahigh-Shear Fluid Processing, Presentation at Particles, May 14, 2006.

Gruverman, Production of Nanostructures Under Ultraturbulent Collision Reaction Conditions—Application to Catalysts, Superconductors, CMP Abrasives, Ceramics and Other Nanoparticles, undated.

Panagiotou, et al., Production of Stable Drug Nanosuspensions Using Microfluidics Reaction Technology, Poster Session, single page, undated.

PCT International Search Report dated Jun. 15, 2009 issued for International PCT Application No. PCT/US09/41511.

\* cited by examiner

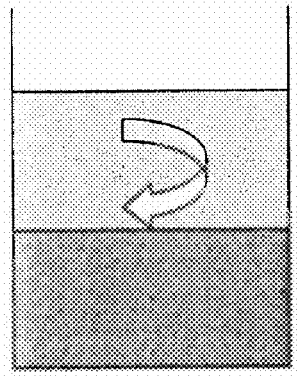
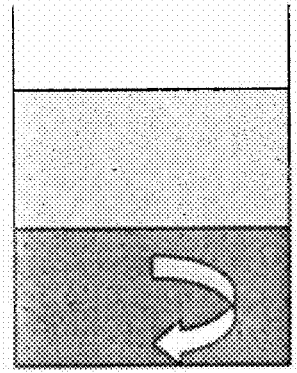
FIGURE 22A          FIGURE 22B
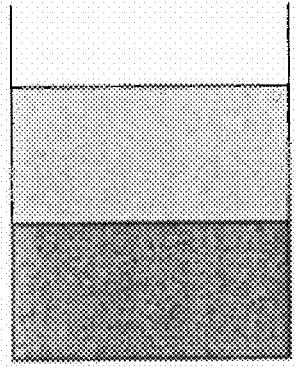
FIGURE 23

APPARATUS AND METHODS FOR NANOPARTICLE GENERATION AND PROCESS INTENSIFICATION OF TRANSPORT AND REACTION SYSTEMS

PRIORITY CLAIM AND CROSS-REFERENCE TO A RELATED APPLICATION

This application is a Divisional Application of application Ser. No. 12/108,245 filed Apr. 23, 2008, the entire disclosure of which is incorporated by reference herein.

TECHNICAL FIELD

The present disclosure is directed to apparatus, systems and methods that facilitate highly effective molecular contact/interaction within a defined reaction chamber, thereby enhancing and/or promoting a host of mixing and/or reaction phenomena. More particularly, the disclosed apparatus, systems and methods are designed to bring together constituent streams for interaction within a defined reaction chamber so as to achieve highly desirable results.

The present disclosure further provides methods for effectively processing materials based, at least in part, on the nature of the feed materials, the potential need/desirability for surfactant(s), concentration and material ratio, energy input to process, regulation of energy dissipation, and nanoscale contact of such feed materials. The disclosed processing methods are effective in delivering products having desired characteristic(s), e.g., desired particle size distribution, morphology, composition and combinations thereof.

BACKGROUND

The role of hydrodynamics should not be underestimated in any facet of the engineering sciences. The flow patterns within process units and their associated transfer lines have a significant impact upon mass, energy and momentum transport rates and reaction proficiency. Thus, system designs generally benefit from the identification of energy dissipation mechanisms and, thus, quantification of the intensity of mixing and contact efficacy. These are generally important factors in materials handling and manufacturing processes.

For example, the intensity of turbulence generally influences the size of particles that are dispersed throughout a fluid, the quality of an emulsion, and the residence time distribution profiles that determine progress and selectivity of chemical reactions. This is particularly apparent in the emerging nanotechnologies, where precipitation and crystallization processes have a significant impact on product quality. Furthermore, mixing characteristics influence and/or determine the performance of reaction vessels, at both laboratory and production scales, and properly designed/implemented mixing systems can permit and/or facilitate the use of continuous systems, in lieu of batch systems, to enhance productivity.

In terms of mixing technologies, cavitation has been used in industry for homogenization operations, i.e., to disperse suspended particles in colloidal liquids. Numerous engineering principles are involved with cavitation behavior (see, e.g., Christopher Earls Brennen, "Cavitation and Bubble Dynamics", Oxford University Press (1995)). Although cavitation-based mixing is often employed with solids, it may not be the best choice for generation of nano emulsions and vesicle loading, as in drug chaperones. Cavitation can result in issues associated with materials of construction and/or scale-up issues for mixing device fabrication. In particular, by forcing a liquid through an annular opening that has a narrow entrance orifice with a much larger exit orifice, a dramatic decrease in pressure results in fluid acceleration into a larger volume and generation of cavitation bubbles. The surface upon which these bubbles collide (causing their implosion) is subjected to tremendous stresses. Thus, materials such as polycrystalline diamond and stainless steel are generally required.

Beyond mixing-related issues, a large number of compounds with potentially high pharmacological value fail to pass initial screening tests because they are too hydrophobic to be effectively formulated. Most formulation strategies aim at increasing the bioavailability of such drugs by particle size reduction, as described extensively in the literature. Such strategies include the production of emulsions, liposomes and functionalized chaperones by high shear processing, the production of nanosuspensions by milling, micronization or high shear processing, and the production of nanoporous materials.

Nano-emulsions, liposomes and other generalized cargo loaded systems can only encapsulate a limited amount of drug. Therefore, current approaches may not be the strategies of choice for drugs with high dosage demands. Nanosuspensions can deliver much larger amounts of drug in a smaller volume than solvent-diluted drug systems and, therefore, have a potential advantage as a formulation strategy.

Most often, nanosuspensions are produced by milling, micronizing or high shear processing. Thus, current methods for manufacturing nanosuspensions primarily rely on the reduction of particle size of drug powders in dry or wet formulations. Such "top-down" processes are generally slow, require repetitive processing cycles, and require substantial energy. Indeed, the targeted particle sizes, usually less than 0.5 microns, are often time consuming and expensive to produce, frequently requiring repetitive processing cycles/passes through the milling/high shear equipment to achieve desired particle size distributions.

Controlled crystallization of drugs is an alternative to the production of drug nanosuspensions through size reduction techniques for generating desired particle size distributions. Crystallization is a method that is used to produce fine chemicals and pharmaceuticals of desired purity and/or for the formation of a specific crystal polymorph with desired crystalline structure and associated properties. However, current crystallization techniques typically produce particles in the range of several microns which are not suitable for delivering highly hydrophobic drugs. More recently, methods for production of nanosuspensions through crystallization have been proposed, but they have not demonstrated the necessary productivity robustness. In particular, the newer procedures lack the control that is required at the various mechanistic steps of crystallization (nucleation rate through crystal morphology and stabilization), process scalability and general applicability.

The patent literature describes processing equipment for particle size control and manipulation. For example, commonly assigned U.S. Pat. Nos. 4,533,254 and 4,908,154 to Cook et al. describe processing systems and apparatus having particular utility in emulsion and microemulsion processing. Flow streams are forced under pressure to impinge in a low-pressure turbulent zone. The disclosed systems/apparatus include a plurality of nozzles that effect impingement of flow sheets along a common liquid jet interaction front.

More recently, commonly assigned U.S. Pat. Nos. 6,159, 442 and 6,221,332 to Thumm et al. describe multiple stream, high pressure continuous chemical mixers/reactors that are adapted to: (i) individually pressurize different liquid streams to high pressure: (ii) individually monitor the flow of each liquid stream; (iii) provide a reaction chamber for receiving the pressurized liquid streams at high velocity; (iv) discharge a product stream which results from mixing of the pressurized liquid source material streams at high pressure and high velocity in the reaction chamber; and (v) control the rate of delivery of each reactant stream to the reaction chamber at a determined continuous stoichiometric rate. The Thumm et al. patents further disclose a closed loop control system that combines individual stream transducers to allow calculation of flow of each stream, computer hardware with control system application software, a hydraulic pressure/flow metering valve for each stream, and input/output connections to the computer hardware for the transducer data and meter valve drive. Of note, Thumm et al. contemplate pressurizing each reactant stream with a hydraulically-driven intensifier, wherein hydraulic pressure-flow metering valves regulate the intensifier's drive, thereby regulating the pressure and flow of each reactant stream.

Beyond the commonly assigned patent filings noted above, reference is made to the following patents/patent publications. Greenwood et al. disclose a sterilizable particle-size reduction apparatus in WO 2005/018687. Kipp et al. disclose methods/apparatus for generating submicron particle suspensions that involves mixing a solution that contains a pharmaceutically active compound that is dissolved in a water-miscible solvent with a second solvent to form a pre-suspension of particles and then energizing the mixture to form a particle suspension having an average particle size of less than 100 µm (see U.S. Patent Publications 2003/0206959 and 2004/0266890; U.S. Pat. No. 6,977,085).

In the field of crystallization, the patent literature includes various teachings from the pharmaceutical industry. For example, U.S. Pat. No. 5,314,506 to Midler, Jr. et al. discloses the use of impinging jets to achieve high intensity micromixing of fluids so as to form a homogeneous composition prior to the start of nucleation in a continuous crystallization process. Nucleation and precipitation are initiated by utilizing the effect of temperature reduction on the solubility of the compound to be crystallized in a particular solvent (thermoregulation), or by taking advantage of the solubility characteristics of the compound in solvent mixtures, or a combination thereof. U.S. Pat. No. 5,578,279 to Dauer et al. discloses a dual jet crystallizer apparatus that includes a crystallization or mixing chamber having opposed angularly disposed jet nozzles. The nozzles deliver the compound to be crystallized and a crystallization agent. U.S. Pat. No. 6,558,435 to Am Ende et al. discloses a process for synthesis/crystallization of a pharmaceutical compound that involves contacting diametrically opposed liquid jet streams, such that the liquid streams meet at a point of impingement to create a vertical impingement film and create turbulence at their point of impact under conditions of temperature and pressure which permit reaction of reactive intermediates to produce a product. The jet streams are disclosed to have sufficient linear velocity to achieve micromixing of the jet stream constituents, followed by reaction and nucleation to form high surface area crystals. See also U.S. Patent Publication No. 2006/0151899 to Kato et al.

Despite efforts to date, a need remains for systems/apparatus and methods that are effective in producing nanoparticles. Systems/apparatus and processes for generation of nanoparticles in an efficient, continuous and reliable manner are also needed. Beyond nanoparticle processing, there remains a need for systems/apparatus and methods that are effective in facilitating various materials processing operations, e.g., reaction, emulsion and/or crystallization processes, by, inter alia, minimizing diffusion limitations to requisite interaction between reactants and/or crystallizing constituents. Still further, a need remains for systems and methods that yield desirable particle size distributions, morphology and/or compositions/phase purities through effective process design and/or control. Indeed, a need remains for systems and methods that effectively control interfacial reaction/contact between constituents to achieve desired processing results, e.g., to reduce the potential for undesirable side reactions. These and other needs are satisfied by the disclosed systems/apparatus and methods.

SUMMARY

Micro-scale apparatus, systems and methods are provided according to the present disclosure that facilitate and utilize microreactor technology to achieve desired mixing and interaction at a micro and/or molecular level between and among feed stream constituents. The disclosed apparatus, systems and methods are capable of various degrees of mixing intensity and control of energy dissipation mechanisms, thereby maximizing useful work in forming surfaces and interfaces between and among constituent molecules/compounds. The present disclosure permits advantageous reductions in system entropy that might be otherwise experienced due to process inefficiencies. Such entropy reduction is a major benefit standing alone, but also translates to minimizing energy lost to heat, sound, light and cavitation. Indeed, reduced system entropy advantageously further translates to a reduced propensity for component damage.

Furthermore, the disclosed apparatus, system and methods advantageously facilitate and/or support process intensification, thereby miniaturizing unit operations and processes through both scale reduction and integration of operational steps, e.g., reaction and separation unit operations. Consequently, processes utilizing the disclosed apparatus, systems and methods offer enhanced efficiency and cost effectiveness. In addition, exemplary embodiments/implementations of the disclosed apparatus, systems and methods are adapted to function in environments that require portability, thereby providing enhanced flexibility in applications and in-use time.

Key design features exploited according to the present disclosure permit control of the amount and form of energy dissipation that occurs at specific locations in the system, particularly the interaction chamber of the disclosed apparatus/systems. High energy input is generally accomplished using intensifier pumps. Narrow flow channels convert energy input from the intensifier pumps to high fluid velocities (kinetic energy) and associated shear rates. The individual jets can be created in a number of ways, using advantageous feed system designs that minimize, and in some cases eliminate, premixing events. According to an exemplary embodiment of the present disclosure, multiple jet streams impinge upon each other in an interaction chamber, where controllable intimate contacting is accomplished. In other exemplary embodiments, intimate contact between constituent streams/molecules may be achieved through shear-based flow designs, e.g., Z-type flow channels. Depending upon the energy dissipation rate, various degrees of mixing intensity (i.e., macro-, meso- or micro-mixing) and associated levels of turbulence intensity (i.e., eddy sizes) are obtained. In exemplary implementations of the present disclosure, the size of the smallest eddies formed, and thus the Kolmogorov scale for the desired diffusion and reaction coordinates, are in the 50-200 nanometer range.

Exemplary apparatus/systems of the present disclosure include at least two feed streams. The feed streams are advantageously fed to an intensifier pump at individually controlled rates, e.g., based on operation of individually controlled feed pumps. In exemplary embodiments, the feed pumps are peristaltic pumps that are adapted to meter the flow of the individual feed streams at desired relative rates. Alternative feed pump designs may be employed, e.g., gear pumps, provided flow control is permitted. In this way, various feed ratios may be achieved. Indeed, through feed pump adjustments, the disclosed apparatus/system facilitates wide ranging variations in feed ratios, thereby permitting and/or supporting various reaction, crystallization and other processing schemes. Of note, one or more recycled streams may be combined with such feed streams as they are fed to or within the disclosed intensifier pump.

The first and second feed streams may be fed from the first/second feed pumps to the intensifier pump in independent feed lines that are combined prior to pressurization by the intensifier pump. Alternatively, the feed streams may flow to the intensifier pump in a coaxial manner. Thus, a first feed stream may flow through a first pipe/line that is positioned coaxially within a second pipe/line. Coaxial combination of the first and second feed lines is achieved through appropriate pipe fitting, as will be apparent to persons skilled in the art. In either case, systems and methods of the present disclosure generally benefit by minimizing the time during which the first and second feed streams are combined/mixed prior to introduction to the disclosed interaction chamber. Indeed, the present disclosure advantageously places the microreactor in close proximity to feed stream intensification. In this way, potentially undesirable reactions and/or other constituent interactions are minimized prior to the point in time when such interactions can occur at the micro- and/or nano-scale, thereby enhancing phase purity and/or selectivity of the disclosed systems and methods.

The intensifier pump is generally effective to pressurize the first and second feed streams to an elevated pressure, e.g., a pressure of up to 40,000 psi. As used herein, the term "intensifier pump" refers to a high pressure pump that is adapted to deliver high pressure output streams, e.g., 500 to 40,000 psi and higher. An exemplary intensifier pump includes an hydraulic pump and a piston that multiplies the system pressure therewithin. Thus, the hydraulic pump may be effective to generate pressures of about 1500 to 3500 psi, and the piston mechanism may be effective to multiply such pressure by a factor of 10× to 30×. Of note, each piston within a pressure assembly may be viewed as a distinct intensifier pump for purposes of the present disclosure. Exemplary intensifier pumps according to the present disclosure avoid cavitation, thereby minimizing potential energy dissipation associated therewith.

In exemplary embodiments, individual feed streams are introduced to an intensifier pump at axially-spaced ports, thereby permitting effective pressurization of such feed streams while limiting potential pre-mixing of constituents prior to introduction to the microreactor. Thus, exemplary intensifier pumps include a plurality of ports with associated piping/tubing for introduction of individual feed streams along the axial flow path of the intensifier pump.

The pressurized stream is then fed to an interaction/reaction chamber, i.e., a microreactor, for interactive contact. The interaction/reaction chamber may be characterized by various geometries. Thus, in exemplary embodiments of the present disclosure, the interaction/reaction chamber may take the form of (i) a "Z" type single slot geometry, (ii) a "Y" type single slot geometry, (iii) a "Z" type multi-slot geometry; or (iv) a "Y" type multi-slot geometry. The interaction/reaction chamber generally defines an internal volume that is on the scale of a microliter, and average velocities in the microchannels may reach 500 m/s. Changes in velocity magnitude and/or direction associated with the disclosed interaction/reaction chambers yields substantially uniform, high shear fields. The high turbulence achieved in the disclosed interaction/reaction chambers advantageously facilitates mixing/contact at the nanometer level.

Various downstream units and/or operations may be provided according to the present disclosure. For example, a cooling jacket or other heat exchange unit may be provided to cool the fluid stream after exiting the interaction/reaction chamber. Recycling of a portion of such outlet stream to the intensifier pump inlet may also be provided, e.g., to facilitate further reaction/crystallization of constituents.

As noted above, the disclosed systems/apparatus are advantageously adapted to control interaction of constituents at a non-nanoscale level. In exemplary embodiments, such control is achieved by providing (i) a first feed line for introducing a first constituent to an intensifier pump, a second feed line for introducing a second constituent to the intensifier pump; and an interaction chamber/microreactor downstream of the intensifier pump, the interaction chamber/microreactor being adapted to effect nanoscale interaction between the first constituent and the second constituent. The first feed line may be coaxially positioned within the second feed line so as to control mixing of the first and second constituents prior to pressurization by the intensifier pump. Alternatively, the first feed line may direct flow to a first intensifier pump port, while the second feed line may direct flow to a second, axially-spaced intensifier pump port. In this way, the opportunity for the constituents to interact prior to processing/interaction within the interaction chamber/microreactor, i.e., at a non-nanoscale level, is effectively inhibited and/or substantially prevented.

The disclosed apparatus, systems and methods make it possible to overcome the limitations of prior art systems through precise control of energy input and dissipation mechanisms that dictate/control process pathways and rates. For example, in an exemplary implementation of the present disclosure, solvent composition may be used to affect supersaturation conditions, e.g., through addition of a miscible non solvent. In further exemplary implementations of the present disclosure, a process/method is provided that employs a solvent/anti-solvent crystallization technique in conjunction with the disclosed apparatus/system to produce advantageous drug nanosuspensions. As compared to micro-mixing models reported in the literature, turbulent energy dissipation rates attainable in the disclosed interaction chambers/microreactors are on the order of $10^7$ W/kg and higher. The disclosed apparatus/system thus achieves rapid micro-mixing (time scale 4 μs) and meso-mixing (time scale 20 μs), with a nominal residence time in the interaction chamber that is on the order of 1 ms. In addition, mixing at the nanometer scale provides a uniform supersaturation ratio which is a major controlling factor in crystal formation and growth. Controlling the timing and location of the mixing of the solvent and anti-solvent streams provides control of the onset of the nucleation process. This control, in combination with a homogeneous supersaturation ratio, results in desirably uniform crystal growth and stabilization rates.

Numerous processes may benefit through use/implementation of the disclosed apparatus and systems. In particular, process implementations benefit, at least in part, based on an ability to maximize the degree to which input energy is desirably directed to forming/establishing interaction surfaces and interfaces. Turbulence and surface tension forces achieved according to the present disclosure are advantageously effective in initiating nano-scale events, such as formation of stable nano-emulsions and formation of sufficient molecular clustering to create/establish homogeneous nucleation sites for crystal growth. Exemplary applications/implementations of the present disclosure also include, but are not limited to, selectivity enhancement in competitive reaction networks, control of size of dispersed solids (whether from reactive precipitation, crystallization and/or declustering), control of crystalline drug polymorph selectivity, and formation of chaperone systems via encapsulation of active ingredients.

Thus, the present disclosure provides exemplary apparatus/systems and methods that facilitate direct impingement of jet streams in a continuous, impinging jet microreactor scalable to at least 50 liters per minute, thereby generating a high level of energy dissipation per unit volume. This energy generation results in intimate contact of the components/constituents in the jet streams. By controlling the velocity of these streams, the present disclosure may establish various levels of mixing scales (i.e., macro-, meso-, and micro-mixing), which translate and/or correspond to varying length scales of turbulent eddies. The smallest eddies establish the minimum length scales at which molecular diffusion processes occur between the jet stream components/constituents which, in turn, establish time scales for phenomenological events to take place. As such, the selectivity in competing reaction networks may be controlled by generating high local concentration gradients of the desired reactants. In alternative implementations, direct jet stream impingement is replaced by high shear microreactor designs, e.g., Z-type channels, that achieve comparable levels of intimate contact/mixing.

The foregoing phenomena are important parameters for reactions/systems that are limited and/or controlled by mass transfer rates/performance. Thus, the present disclosure advantageously facilitates formation of critical sized clusters that become homogeneous nucleation sites for crystal growth via high degrees of local super-saturation. Such nucleation sites influence the molecular diffusion processes forming surfaces, their growth rates, integration of various molecular species into the surface, and ultimate size and purity of the particles formed.

The foregoing molecular species may form various polymorphs, and the desired form can be obtained through manipulation of operational parameters, e.g., microreactor design, microreactor geometry, pressure generated by the intensifier pump, supersaturation ratio, solvents, antisolvents, temperature and combinations thereof. Mass transfer limitations in multiphase reacting systems can be overcome according to the present disclosure, e.g., in the production of biodiesel, because the liquid reactants have limited solubility in each other and, therefore, an interfacial reaction must occur during an initial "lag phase". The rate of such interfacial reaction may be enhanced by dispersing small droplets of one phase into the other, greatly improving the interfacial surface area to volume ratio.

The same phenomenon is noted when heterogeneous reactions involving solid particles are involved. In particular, a surface-to-volume enhancement accelerates turnover rates proportional to surface area availability, whether the surface is catalytic or a reactant. Moreover, boundary layer resistances are reduced as particle size is reduced, once again promoting reaction rates up to their fundamental/intrinsic rates. This phenomenon is also applicable when interfacial mass transfer limits downstream separation processes, e.g., for downstream extraction, absorption, and adsorption processes, and for formation of stable emulsions, with or without surface active agents, since droplets at nano scale sizes, although thermodynamically unstable, can exist for lengthy time scales due to an extremely slow kinetics response.

Chaperone systems, such as with immiscible fluids or isolation requirements from the continuous phase (as in targeting for imaging and/or drug delivery) are readily prepared via the present disclosure using surface active agents as the encapsulate and, due to minimization of potential heat effects while processing vesicles, heat liable surface active agents, such as those with protein functionality, can be utilized. Of note, the high shear forces associated with the disclosed interaction chambers can be beneficial when shear thinning or thickening behavior is to be exploited during processing.

In addition, the present disclosure facilitates encapsulation down to the nano-scale of hydrophobic substances within amphi-morphic surfactants for dispersion in hydrophilic environments (or vice versa), as in nutraceutics, pharmaceutics, and cosmetics. The encapsulates can also be useful in functionalizing membranes and providing "smart" characteristics; for example, as (a) sequestering agents in guard systems, (b) controlled release of growth factors in tissue engineering applications, (c) soluble gas transport enhancement, and (d) in general sensor/recorder systems. The disclosed apparatus/systems and methods may be used to facilitate both fast and slow processes, and to facilitate chemical reactions and physical processes, such as crystallization.

Further, the present disclosures advantageously facilitates production of polymer nanosuspensions in the range of 50-500 nm using both emulsion and precipitation methods. By controlling processing parameters, nanosuspensions with various polymer sizes and densities may be created. The disclosed systems/methods may be used to provide active pharmaceutical ingredients (APIs) that are encapsulated or otherwise contained within a polymeric matrix. In this sense, the polymeric matrix functions as a "chaperone" for such API's. The polymeric matrix is generally amorphous and may advantageously define a biocompatible and/or bioabsorbable product. The feedstream for such processing techniques may include monomeric constituents, polymeric constituents or combinations thereof.

Exemplary processing roadmaps for processing regimens may be developed using the disclosed apparatus/systems. For example, roadmaps for drug crystallization may be developed as follows: (i) determine solvent, antisolvent and surfactant constituents based on applicable input criteria, e.g., solubilities, toxicities, compatibility and screening experiments; (ii) introduce the selected solvent, antisolvent and surfactant constituents to the disclosed apparatus/system to produce advantageous nanosuspensions based on applicable process variables, e.g., microreactor chamber design, pressure and supersaturation ratio; and (iii) purify the nanosuspension (if required) to recover crystallized drug, e.g., using centrifuge, filter, rinsing and/or lypholization techniques. The disclosed roadmaps may be used to yield crystallized particles characterized by desired particle sizes and particle size distributions.

More generally, roadmaps may be developed and implemented for various processing regimens according to the present disclosure. Exemplary methods may involve, infer alia:

a. Identifying a solvent or first reactant/continuous phase, and an antisolvent or second reactant/dispersed phase which together define a process stream;

b. Determining need for surfactant(s) to achieve desired stability/control of process stream;

c. Determining concentration of target molecule/species or reactants within solvent or process stream/dispersed phase, and ratio of solvent/antisolvent or reactants/continuous phase/dispersed phase to achieve a predetermined level of supersaturation or contact efficiency/efficacy to drive relevant mechanism, e.g., crystallization mechanism, reaction mechanism, emulsion mechanism, coating mechanism, etc.;

d. Introducing predetermined amount(s) of energy to the process stream;

e. Regulating energy dissipation mechanism(s) at specified locations within system;

f. Contacting the solvent/antisolvent, reactants or continuous/dispersed phases in a confined volume at a nanoscale so as to deliver product of a desired characteristic, e.g., products having a desired particle size distribution, morphology, composition and/or combinations thereof.

Additional advantage features, functions and implementations of the disclosed apparatus, systems and methods will be apparent from the description which follows, particularly when read in conjunction with the appended figures.

BRIEF DESCRIPTION OF THE FIGURES

To assist those of ordinary skill in the art in making and using the disclosed apparatus, systems and methods, reference is made to the accompanying figures, wherein:

FIGS. 13A and 13B are SEM images of control crystals produced according to experimental runs, wherein FIG. 13A shows NFN particles grown in a no shear environment (100×) and FIG. 13B shows those same crystals after being reduced using standard Microfluidizer® technology (30 passes at 30,000 psi; 1000×);

FIGS. 22A and 22B are schematic depictions of a system wherein phases are independently agitated in sequence;

FIG. 23 is a schematic depiction of a system wherein both phases are non-agitated;

DESCRIPTION OF EXEMPLARY EMBODIMENT(S)

The present disclosure provides advantageous apparatus, systems and methods for achieving effective contact/interaction of constituents within a defined chamber, i.e., an interaction chamber or microreactor, to enhance and/or promote a host of mixing and/or reaction phenomena. Set forth herein below are descriptions of exemplary apparatus/system designs and implementations, including exemplary implementations and beneficial results achieved thereby. Although the apparatus, systems and methods of the present disclosure are described with reference to exemplary embodiments and implementations, it is to be understood that the present disclosure is not limited to such illustrative examples. Rather, the disclosed apparatus, systems and methods may take various physical forms and be applied to a multitude of processing schemes and environments, without departing from the spirit or scope of the present disclosure.

A. Exemplary Apparatus/System Design(s)

Exemplary apparatus/systems according to the present disclosure are generally designed to accommodate the interaction of two or more liquid streams, e.g., reactants. The two or more liquid streams are generally pumped to an intensifier pump by individual feed pumps. The disclosed apparatus/systems are designed such that the liquid streams are combined, mixed in a controlled ratio, in a controlled location, and with controlled energy input.

Figure 1:
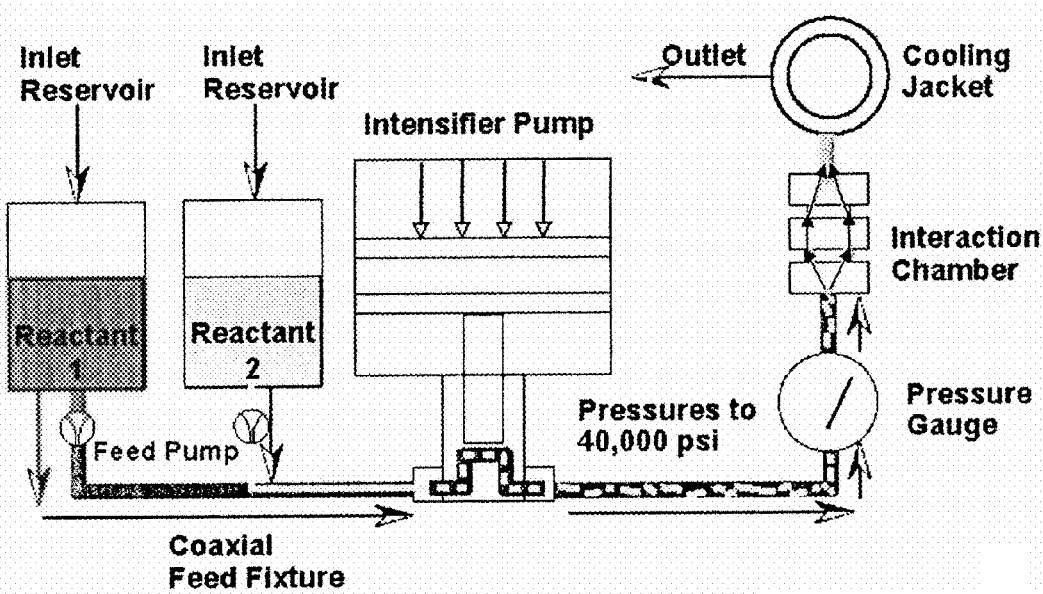
FIG. 1 is a schematic depiction of an exemplary system for processing of two liquid/reactant streams according to the present disclosure.

With initial reference to FIG. 1, two exemplary liquid streams ("Reactant 1" and "Reactant 2") are schematically depicted as part of a processing arrangement according to the present disclosure. The liquids/reactants may take various forms and exhibit various properties according to the present disclosure, e.g., they may be multiphase fluids, miscible fluids and/or immiscible fluids. The reactants are depicted in connection with feed vessels/reservoirs. Of course, the manner in which the liquid streams are processed and/or stored prior to introduction to the disclosed processing apparatus/system may vary widely, with the disclosed reactant reservoirs being merely illustrative of pre-processing handling/storage of reactant/fluid streams. The reactants are generally combined in connection with an intensifier pump or other high pressure pump, so as to pressurize such combined reactant stream (e.g., to pressures up to 40,000 psi) for feed to an interaction chamber.

Of note, the exemplary apparatus/system that is schematically depicted in FIG. 1 includes a coaxial feed feature/design for delivery of the reactants to the intensifier pump. In this regard, the feed line/pipe for a first reactant, e.g., Reactant 1, may be positioned within the feed line/pipe for a second reactant, e.g., Reactant 2, such that delivery of such reactant streams to the intensifier pump (or other high pressure pump) is substantially coaxial. Thus, the feed line/pipe for the second reactant may define a larger internal/diameter as compared to the outer diameter of the feed line/pipe for the first reactant, thereby permitting flow of the second reactant in a ring-shaped flow channel defined around the exterior of the feed line/pipe for the first reactant. In this way, mixing between the first and second reactants is avoided (or substantially minimized) until immediately prior to pressure intensification. Accordingly, premature interaction between the first and second reactants is advantageously avoided and interaction between such reactants occurs in the interaction chamber/microreactor, e.g., at the nanoscale level. Alternative flow patterns may be employed, e.g., side-by-side feed lines/pipes, to minimize/prevent premature interaction and/or mixing without departing from the spirit or scope of the present disclosure.

The feed pump(s) in combination with the intensifier/high pressure pump control the flow rate ratios of the two streams. The energy input to the fluid at different locations of the system is controlled by the geometry of the flow path. Thus, energy dissipation may be controlled/minimized through advantageous piping design/layout, the design/geometry of the interaction chamber/microreactor, and the design/layout of heat exchanger positioned downstream of the interaction chamber. Typically, energy dissipation is most strongly influenced by the design/geometry of the interaction chamber/microreactor, e.g., through turbulence and/or shear associated therewith.

The liquid/reactant streams advantageously interact inside the fixed geometry interaction chamber/microreactor at the nanometer scale. Downstream of the interaction chamber/microreactor, the combined liquid stream is typically fed into a heat exchanger where it is cooled or heated (if desired). Of note, the liquid may be collected, in whole or in part, at this processing stage. However, in exemplary embodiments/implementations of the present disclosure, the liquid stream is recycled to the apparatus/system, in whole or in part, e.g., through introduction of a recycle feed upstream of the intensifier pump/high pressure pump.

With reference to FIGS. 2A-2D, exemplary flow implementations according to the present disclosure are schematically depicted. Thus, with initial reference to FIGS. 2A and 2B, an hydraulic pump is powered by a motor so as to deliver hydraulic oil to an intensifier pump. First and second feed streams are combined immediately prior to introduction to the intensifier pump (see FIG. 2B) and the combined stream is pressurized for delivery to a reaction chamber. Upon exiting the reaction chamber, the combined stream enters a heat exchanger for temperature control (i.e., cooling or heating). Of note, the first and second feed streams may be combined in a manifold, tee or the like prior to introduction through a port into the intensifier pump.

Figure 2A:
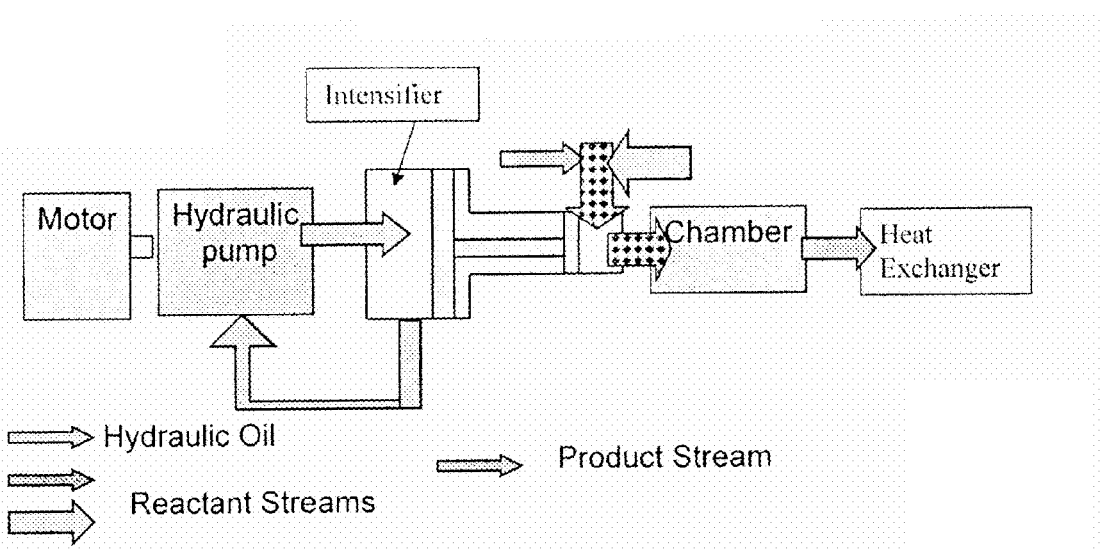
FIGS. 2A and 2B are schematic depictions of a further exemplary system for processing liquid reactant streams according to the present disclosure, wherein two streams are mixed immediately prior to introduction to an intensifier pump.
Figure 2B:
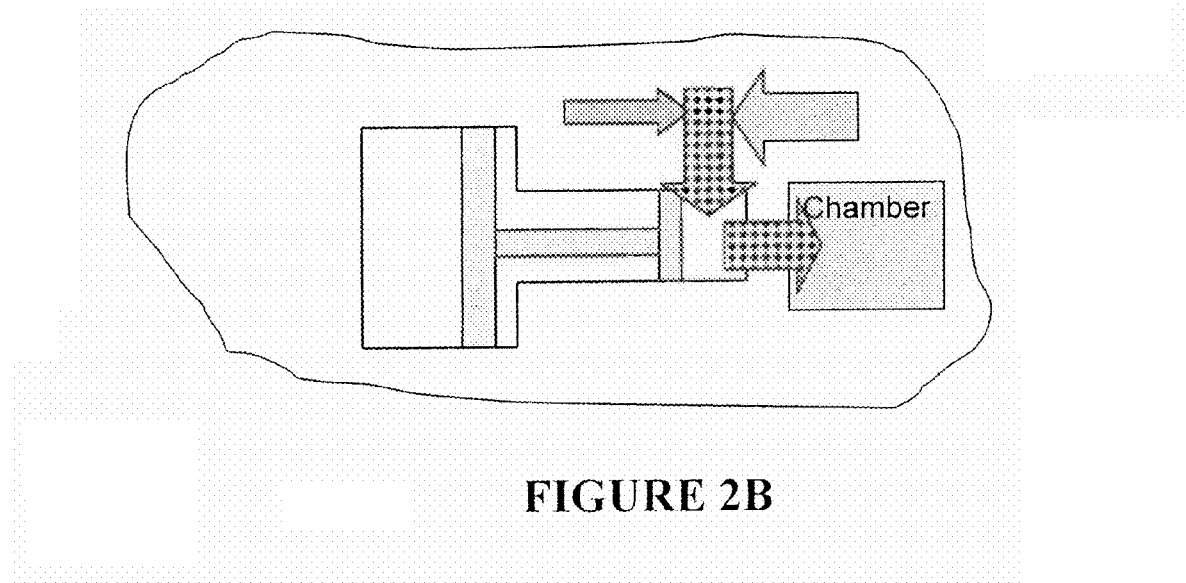
Figure 2C:
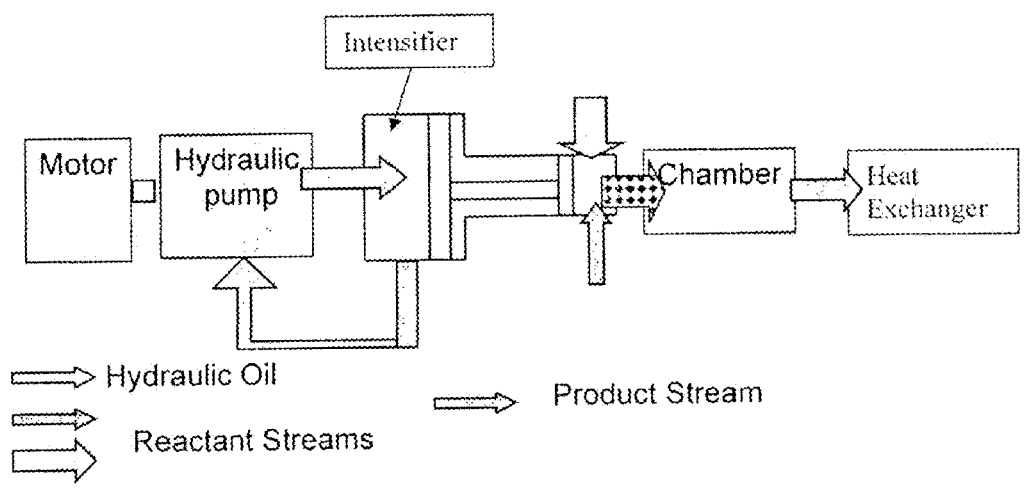
FIGS. 2C and 2D are schematic depictions of an additional exemplary system for processing liquid reactant streams according to the present disclosure, wherein two streams are independently introduced to separate ports formed in an intensifier pump.
Figure 2D:
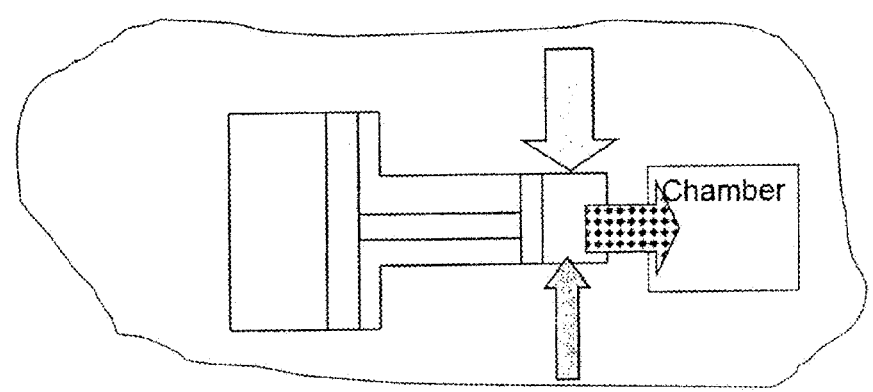

Turning to FIGS. 2C and 2D, an alternative exemplary fluid delivery/intensifier pump design is schematically depicted. The intensifier pump defines a plurality of ports for introduction of individual fluid streams thereto. As schematically depicted in FIG. 2D, the ports may be oriented on opposite sides of a chamber defined by the intensifier pump. The ports may also be axially spaced relative to the fluid flow path through the intensifier pump (whether on the same or opposite sides thereof), such that individual feed streams are introduced to the intensifier pump at distinct axial locations therewithin. In the schematically depicted embodiment of FIGS. 2C and 2D, two distinct ports are provided with respect to intensification pump—one port for receipt/delivery of a first reactant stream and a second port for receipt/delivery of a second reactant stream—but additional ports may be provided (e.g., additional axially-spaced and/or peripherally-spaced ports). Thus, for example, further ports may be provided in connection with the disclosed intensifier pump for receipt/delivery of a recycle stream, a further reactant stream and/or processing stream (e.g., a surfactant stream), and/or portions of the reactant streams introduced to the first and/or second depicted ports. By providing distinct feed ports (e.g., axially-spaced and/or peripherally-spaced ports) in connection with the disclosed intensifier pump, the apparatus/system of the present disclosure is advantageously adapted to further minimize the interaction/contact between individual fluid/reactant streams prior to introduction to the downstream microreactor.

Figure 3:
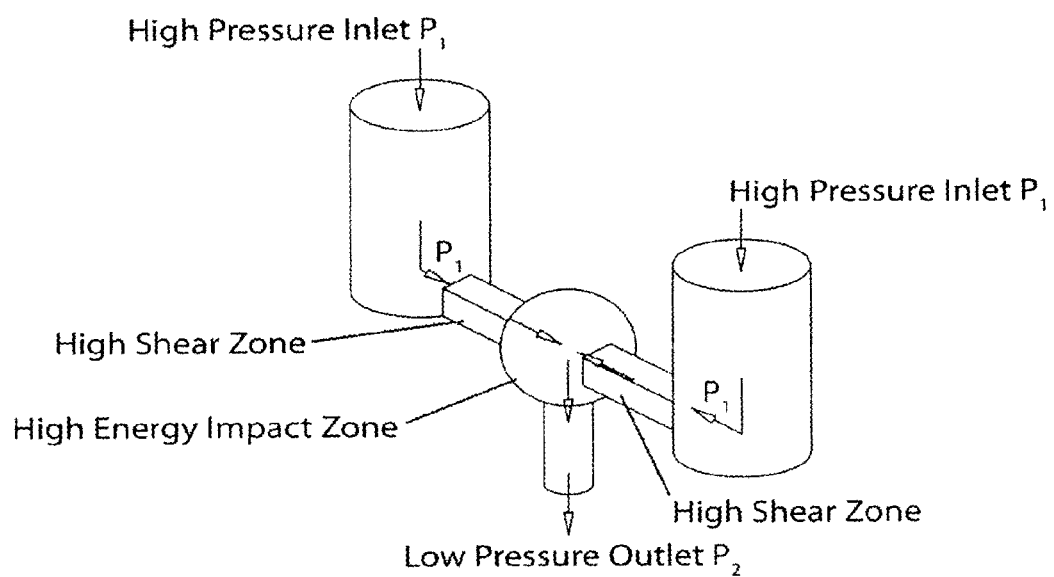
FIG. 3 is a schematic depiction of an exemplary opposed jet reaction chamber.

FIG. 3 provides a schematic depiction of an exemplary opposed jet reaction chamber. The geometry of the interaction chamber/microreactor may take various forms to effect the desired shear field and/or shear force. For example, the interaction chamber may be characterized by (i) a "Z" type single slot geometry, (ii) a "Y" type single slot geometry, (iii) a "Z" type multi-slot geometry; or (iv) a "Y" type multi-slot geometry. Each of the foregoing interaction chamber/microreactor geometries is known in the art and is generally adapted to provide a high shear field for interaction between the reactants/constituents introduced thereto. The disclosed interaction chambers/microreactors are generally effective to generate nanoscale mixing, tight particle size distributions, and high levels of repeatability/scalability.

Figure 4A:
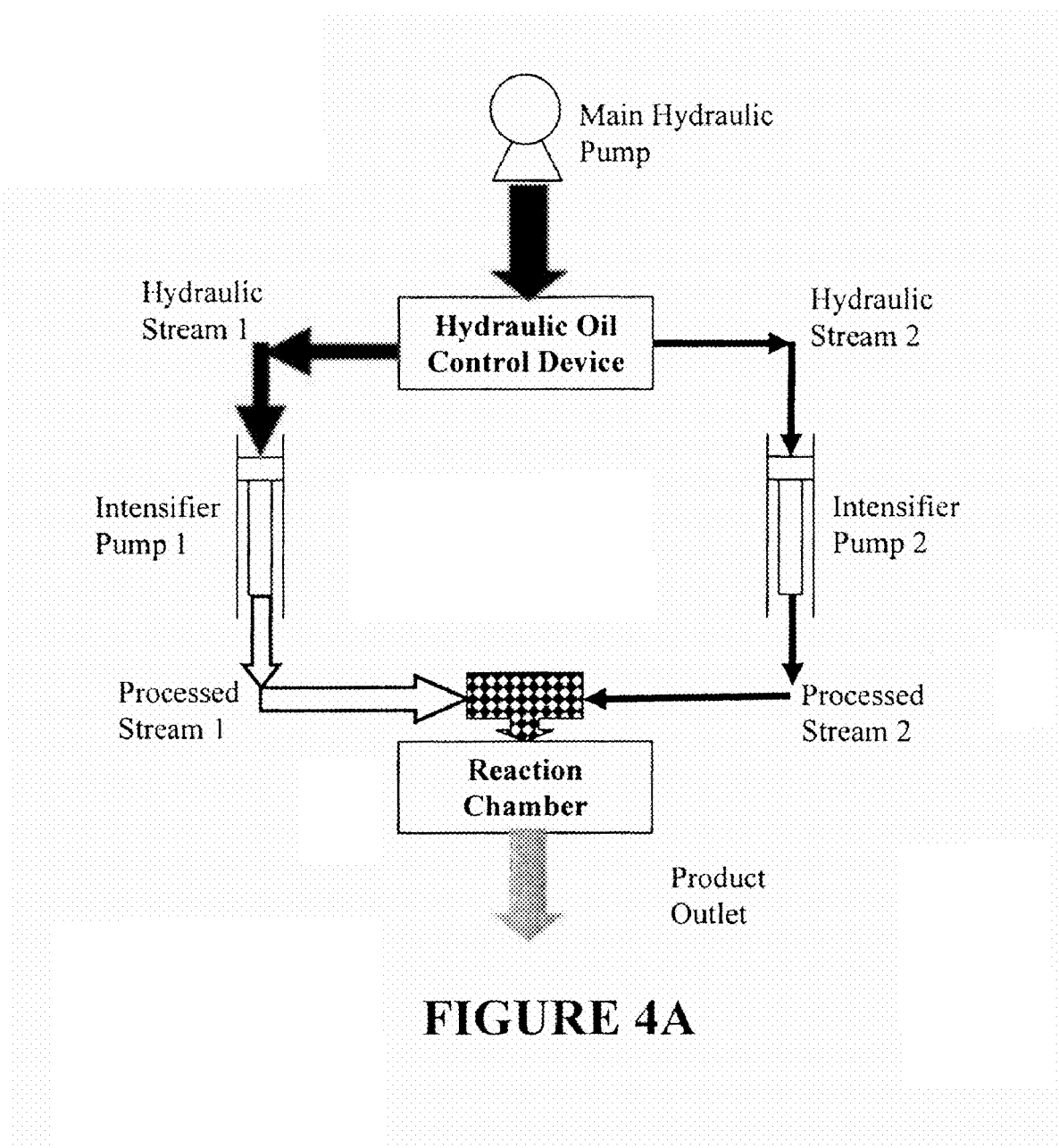
FIG. 4A is a schematic depiction of an exemplary feed stream implementation that includes hydraulic-based control according to the present disclosure.
Figure 4:
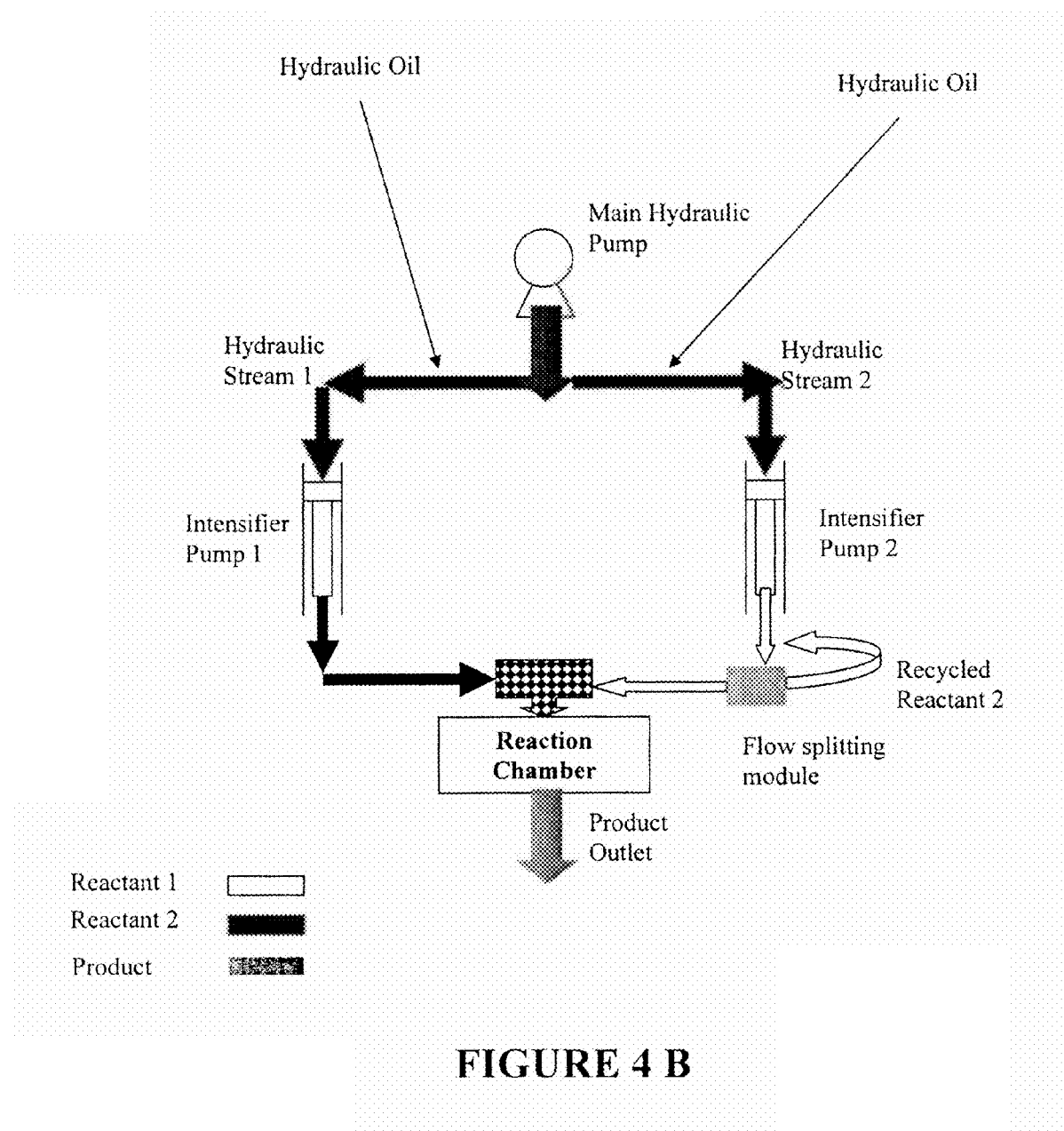
FIG. 4B is a schematic depiction of an exemplary feed stream implementation that includes a recycled reactant/stream according to the present disclosure.

As schematically depicted in FIGS. 4A-4B, the intensifier pump generally includes a hydraulic system for generating the high pressures associated with the disclosed apparatus/system. Thus, the hydraulic system typically includes a motor that drives a hydraulic pump for pressurizing hydraulic fluid, e.g., hydraulic oil, for delivery to the intensifier pump. The hydraulic oil flows into and through the intensifier pump, delivering the requisite drive threes for pressurization of the fluid streams passing therethrough. The hydraulic oil then cycles back to the hydraulic pump. In this way, a closed hydraulic system is provided in connection with the disclosed intensification pump.

With specific reference to FIG. 4A, an exemplary implementation of the present disclosure includes a single main hydraulic pump that is adapted to pump hydraulic fluid, e.g., hydraulic oil, to an hydraulic oil control device. The control device is adapted to control the outflow of multiple hydraulic streams, e.g., hydraulic stream 1 and hydraulic stream 2. The control device may be manually controlled and/or subject to an automatic control system (e.g., a feedback control loop), whereby the relative levels of outflow may be controlled adjusted. Thus, for example, outflow to hydraulic stream 1 and outflow to hydraulic stream 2 may differ, such that intensifier pump 1 is hydraulically powered to a differing degree as compared to intensifier pump 2. In this way, the flow of processed streams 1 and 2 may be controlled/metered, thereby allowing variable flow rates to be delivered to the reaction chamber.

With reference to FIG. 4B, an alternative hydraulic system is depicted wherein the main hydraulic pump feeds hydraulic fluid/oil to a manifold/tee which generates hydraulic stream 1 and hydraulic stream 2 which, in turn, drive intensifier pumps 1 and 2. As shown in FIG. 4B, the exit flow from intensifier pump 2 is directed to a flow splitting module that is adapted to recycle a portion of the reactant stream. In this way, the overall flow of reactant 1 and reactant 2 to the reaction chamber may be controlled/metered. Of note, the recycled reactant 2 is at a high pressure, and appropriate check valve arrangements are generally included to ensure proper flow of reactant 2 through the disclosed system. Thus, the flow implementation of FIG. 4B is effective to deliver reactants 1 and 2 to the reaction chamber at differing rates, and the control thereof may be effected through variations at the flow splitting module.

Of note, various alternative system designs may be employed according to the present disclosure to control the ratio of feed streams delivered to the microreactor. Thus, in a first alternative system design, upstream metering of process streams may be employed, e.g., through valve(s), manifold(s) or the like. Each individually metered feed stream is fed to the intensifier pump(s), either directly (and individually) or as a combined stream (e.g., after combination in a manifold).

In a second alternative system design, feed streams may be fed to intensifier pumps that are arranged in parallel. Each intensifier pump is associated with its own downstream load, e.g., through recycling of a portion of the high pressure flow exiting the intensifier pump. Metering of the feed streams may thus be achieved by regulating/controlling the degree to which each individual stream is recycled after exiting its associated intensifier pump. By recycling a greater percentage from a particular intensifier pump, the relative percentage of such feed stream is reduced from a downstream perspective.

In a further alternative design, the flow of feed streams through respective intensifier pumps is controlled/regulated by controlling the flow rate of hydraulic fluid to individual intensifier pumps. The control of hydraulic fluid flow may be effectuated through appropriate valving. To the extent a first intensifier pump receives higher levels of hydraulic fluid relative to a second intensifier pump, the feed stream that is directed to the first intensifier pump will be delivered downstream at a higher relative level as compared to a feed stream directed to the second intensifier pump. Indeed, by regulating the flow of hydraulic fluid to an intensifier pump, a piston's rate of travel may be controlled, thereby directly impacting the fluid flow therethrough.

Each of the disclosed system designs may be advantageously employed according to the present disclosure to achieve variable/desired interaction ratios between feed streams within the downstream microreactor.

B. Exemplary Process Implementations

The disclosed apparatus/system may be used in a wide range of applications and/or implementations, e.g., particle size reduction applications (e.g., emulsion and suspension applications), cell disruption application (e.g., e-coli and yeast applications), and reaction applications (e.g., crystallization applications). Several exemplary applications/implementations are described herein below. However, such exemplary applications/implementations are merely illustrative, and are not limiting with respect to the scope of the present disclosure.

Before describing specific exemplary implementations of the present disclosure by way of "examples" herein below, several broad principles having applicability to the disclosed apparatus/systems and their application are described. These broad principles may be employed to identify, evaluate, implement and/or enhance operations according to the present disclosure.

(a) Physical Processes

Examples of physical processes that may be facilitated and/or supported according to the present disclosure include crystallization processes, precipitation processes, emulsion formation processes, particle coating processes and particle mixing processes. The foregoing processes generally benefit from molecular interaction at the nanometer scale. Each of these processes can be undertaken using the disclosed apparatus/systems according to different methods and/or roadmaps (i.e., processing of specific constituents under specific process parameters to achieve specific results), as will be readily apparent to persons skilled in the art. For example, processing a solvent and antisolvent stream (and optionally a surfactant) with the disclosed apparatus/system may lead to crystallization or precipitation of the solute dissolved in the solvent stream. Similarly, changing the pH of a solution by mixing the initial solution with a stream that changes the pH of the final solution may result in crystallization and/or precipitation of the solute.

In addition, emulsions may be formed by direct and continuous interaction of continuous and dispersed phases, e.g., an oil stream with an aqueous/water stream. Typically, stable emulsions and nano-emulsions are formed in two steps. Initially, a coarse pre-emulsion is made by mixing the immiscible liquids with conventional mixing equipment, such as a propeller or a rotor/stator mixer. Subsequently, the coarse emulsion may be processed using a standard MICROFLUIDIZER® processor (Microfluidics Corp., Newton, Mass.) or a high shear homogenizer. However, with the disclosed apparatus/system, the step of producing pre-emulsions may be advantageously avoided.

Further, coating of solid particles can be achieved according to the present disclosure by interacting liquid suspensions of solid particles with a solution containing the desired coating material(s). Coatings can thus be formed by physical or chemical adsorption of the coating material onto the particle surface.

(b) Chemical Processes (Chemical Reactions)

Chemical reactions of single or multiphase liquids can be enabled and/or expedited according to the present disclosure, e.g., when reactant streams are forced to interact inside the fixed, small volume geometry of an interaction chamber/microreactor. Flow through the interaction chamber/microreactor advantageously increases the interaction surface area among the reactant streams to a significant degree, thereby minimizing potential diffusion limitations and increasing reaction rates. Undesirable side reactions and/or slow reactions can be minimized by creating conditions within the disclosed interaction chamber/microreactor, wherein the conditions are analogous to a "well stirred reactor". Indeed, the disclosed apparatus/systems may be effective in avoiding reactions that are a result of concentration gradients.

Exemplary chemical reaction categories that are supported by the disclosed apparatus/systems include acid-base reactions, ion exchange processes, reduction/oxidation reactions, polymerization reactions, precipitation reactions, crosslinking reactions, reactive crystallization reactions, biodiesel reactions, and the like. More particularly, the following exemplary application/implementation categories may benefit from processing with the disclosed apparatus/system: (i) production of nanoparticles via crystallization, precipitation or chemical reactions; (ii) coating of particles; (iii) mixing of heterogeneous materials at the nanometer scale; (iv) expediting chemical reactions, and (v) Process Intensification C. Performance Enhancement According to testing performed according to the present disclosure, mixing intensity may be identified from estimates of the length scales associated with turbulent eddies (and thus Kolmogorov diffusion lengths) in the nanometer range. Time scales for the macro-, meso-, and micro-mixing processes may thus be estimated and, along with the length scales, prediction of operational roadmaps may be undertaken that correlate well with transport rates, particle size observations, and well established theoretical approaches. Such testing permits enhancement of system performance, such that the disclosed apparatus, systems and methods may be effectively and advantageously used, inter alia, to measure millisecond kinetics, conduct micro-scale reactions, facilitate formation of nano-emulsions/suspensions via turbulent mixing, and achieve enhanced mass transfer operations needed for controlled nucleation and growth in precipitation and crystallization, e.g., for protein and inorganic substances.

Representative values for system parameters according to exemplary implementations and/or applications of the present disclosure are as follows:

reaction chamber residence times from 0.5-1 ms;
micro-mixing time scales of 1-4 μs;
turbulent energy dissipation rates on the order $10^7$-$10^8$ W/kg;
nano-emulsion droplet and particle diameters in the range 25-500 nm:
diffusion coefficients from $1$-$5 \times 10^{-9}$ $m^2/s$; and
interface transfer coefficients as high as 0.5 m/s.

Chemical conversion and pathway selectivity of 100% can be advantageously demonstrated according to exemplary implementations of the present disclosure.

As a general principle, process intensification (PI) facilitates integration of operational steps within a smaller number of scale-reduction vessels, thereby supporting miniaturization of unit operations and processes. In situ separation schemes within continuous flow micro-reactors are classic examples. Adaptation of PI strategies based on the present disclosure provides numerous benefits. Exemplary advantageous outcomes that may be realized through adaptation of the disclosed PI strategies include:

High throughput with higher product purity and uniformity
Efficient start-up and shut-down procedures, which translates to, inter cilia, reduced inventory/surge systems and reduced "off-specification" material
Decreased expenditures, which translates to, inter alia, low/reduced capital costs, lower energy use and reductions in other operating costs, and reduced space requirements/smaller plant footprint
Enhanced operability and control
Environmental advantages and/or pollution prevention
Lower plant profile
Safety benefits, which translate to, inter alia, decreased volumes of explosive, hazardous or toxic compounds, enhanced operator friendliness, and potential isolation in secondary containment chambers, as desired The systems and methods of the present disclosure facilitate improved reactor performance. In particular, the disclosed reactors can provide a number of key advantages by, for example, cutting residence times, accelerating reaction rate, minimizing side reactions and/or reducing energy intensive downstream processing steps, such as distillation and extraction. With many reactions, there are significant heat and mass transfer limitations which are determined by the contacting patterns obtained via the intensity of mixing (i.e., the hydrodynamics). These heat/mass transfer limitations can thus control the observed system dynamics, rather than fundamental kinetics of the reaction system.

Depending on reaction dynamics of a particular system, there are several ways that apparent reaction rate of a particular system can be increased according to the present disclosure. For example, mass transfer limitations that are common to heterogeneous reactions may be removed by increasing the surface area-to-volume ratio of the dispersed phase. Once the mass transfer limitations are removed (or substantially reduced), the reaction may advantageously proceed according to the intrinsic kinetics.

As a further example, enhanced identification and/or control of the temperature profile throughout the reactor may be achieved, which generally leads to better control of the reaction rate. By way of illustration, a highly exothermic reaction carried out in a large batch vessel may require several hours, not because of any inherent kinetics constraint but because of the time necessary to remove the heat of reaction safely via its poor transfer area-to-volume ratio using a traditional coil configuration. With intense mixing and improved heat transfer mechanisms associated with the low holdup of material in the reactor, better productivity is possible according to the present disclosure. As a result of these enhanced transport capabilities/features, the selectivity of a multiple reaction scheme increases, resulting in improved product yields and quality with reduced separation requirements.

Of note, process data, coupled with computational fluid dynamics (CFD) modeling, may advantageously provide a basis for design, redesign and/or reconfiguration of system designs and layouts. CFD can also be used to predict: (1) velocity and stress distribution maps in complex reactor performance studies; (2) transport properties for non-ideal interfaces; and (3) materials processing capabilities useful in encapsulation technology and designing functional surfaces, especially where self-assembly mechanisms, surface tension and interfacial forces, and turbulent energy driven processes dominate.

D. Precipitation and Crystallization Processes

Both precipitation and crystallization processes are characterized by a solid material that is formed from solution. Such processing schemes are widely used in production of pharmaceutically active ingredients, proteins and other chemical products. The main difference in these two processes is that precipitation produces a solid of poorly defined morphology, whereas crystals grow with a well defined 3-dimensional lattice structure. Typically, the primary objectives for both precipitation and crystallization processes are to (1) increase concentration, e.g., when precipitating from a dilute solution, and/or (2) purify a material, such as when selectively crystallizing one species from a solution containing multiple types.

Each process is generally initiated by changes in the thermodynamic state of the solution, thereby reducing the solubility of the target species. Initiation may thus be undertaken via temperature adjustment(s), concentration adjustment(s), e.g., by addition of antisolvents, or adjustment of solution activity coefficients, e.g., by addition of ionic species. As an example, when dealing with solubility of proteins, processing approaches may include: (1) pH adjustment to the isoelectric point, (2) addition of organic solvents, (3) increasing ionic strength to cause salting out, and/or (4) addition of non-ionic polymers.

Nucleation sites must be created to initiate precipitation and/or crystallization processes, either by generating a very high super-saturation resulting in spontaneous growth (homogeneous nucleation) or seeding the solution with surfaces for growth (heterogeneous nucleation), whether inert or the desired target species. In all cases, it is essential that the solubility of the target species be reduced below the actual concentration in solution. This effectively creates a concentration in excess of the thermodynamic equilibrium saturation value and rate processes then dominate system behavior. The magnitude of the difference from equilibrium, i.e., degree of super-saturation, influences both type and rate of system response.

Precipitation conditions are often obtained via chemical reactions producing species with limited solubility in the reaction mixture. This is one method of generating the local high degrees of super-saturation required for desired rapid kinetics. The process occurs in four serial, but often overlapping, steps:

(1) The feed solution and reagent are mixed. The time required to achieve homogeneity is generally dependent on diffusivity of the target species and distance the target species molecules must travel within the mixing eddies (i.e., Kolmogorov length), which can be estimated using turbulence theory. Calculation/analysis requires knowledge of the mixing power input and subsequent energy dissipation rate per unit volume along with solution properties such as density and viscosity.

(2) Subsequent to the mixing step which is aimed at obtaining a desired degree of super-saturation, nucleation of small solid particles occurs. The nucleation rate increases exponentially with respect to super-saturation up to a characteristic limiting rate, and the features of the product formed depend significantly on this rate. If the nucleation rate is too high, the result is likely to be a colloid (i.e., highly solvated) and, thus, complicated downstream processing may be required.

(3) Growth rate is determined by diffusion of solute molecules from the bulk solution to the solid surface and/or a surface integration rate, until a limiting particle size is reached. The limiting particle size is generally determined by the magnitude of shear in the mixed solution.

(4) Once the limiting particle size is reached, further growth is by flocculation, whereby particles collide and adhere to each other. Particle number thus decreases with time exponentially as the particle size increases. Finally, as the particles grow in size, the shear forces in the mixed solution cause fracture; resulting in a size plateau at long mixing times.

Thus, important parameters in a precipitation process are (a) degree of super-saturation achieved in the initial mixing, which is dependent upon reagent volume, and (b) shear stress in the mixed solution, which is proportional to power input per unit volume of solution.

Like precipitation, the crystallization process begins by reducing the solubility of the target species. However, relatively low degrees of super-saturation are utilized since, at high levels, the solids formed tend to be an amorphous precipitate (rather than crystalline). Control of the rate processes, as discussed above, is essential to directing the path to a desired final thermodynamic state and to achieving a desired morphology. Spontaneous formation of solids can entrap undesired species into the lattice framework. Thus, slowing the growth rate by reducing/lowering the super-saturation level permits higher selectivity in the surface integration mechanism, i.e., crystals are formed that are very pure due to exclusion of other contaminate species. Locally high shear forces can also help maintain appropriate/desirable transport gradients. Crystallization may thus be used as a primary separation method and/or as a finishing step to yield product of desired purity according to the present disclosure.

E. Nano-Encapsulation

The ability to form nanoscale particles and/or emulsions that encapsulate active ingredients has applicability in many facets of the engineering biosciences. For example, nano-technologies are having a major impact on drug delivery, molecular targeting, medical imaging and biosensor development, as well as on cosmetic and personal care products, and nutraceutics. Unfortunately, conventional mixing equipment in which a high shear, elongated flow field is generated near the tip of high-speed blade(s) only generate emulsions with droplet sizes in the range 500 nm and larger. Such emulsions are stable only if sufficient surface active agents are present to control agglomeration and re-growth. This approach to emulsion stability requires proper distribution of the surfactant for the appropriate surface coverage of the droplets, thereby minimizing Oswalt ripening and subsequent undesired size distribution changes. The higher shear rates achieved according to the present disclosure advantageously facilitate generation of stable mean particle sizes in the range 50 to 100 nm and requisite/desired narrow particle size distributions. The disclosed systems/techniques may also advantageously dispense with the need for surfactants for stability, dependent upon the surface characteristics of the emulsion components and their intended applications.

F. Creating Nano-Scale Particles/Entities

High shear fields have been developed in the interaction chambers/microreactors of the present disclosure to produce particles with diameters in the range 50 to 100 nm. Such particles are about the size of the smallest turbulent eddies generated in such processing units. For example, jet impingement on a solid surface (e.g. Z-type microreactor) or with another jet (e.g., Y-type microreactor) has been shown to be highly efficient. Systems that incorporate high velocity linear fluid jets that collide can rapidly reduce the scale of segregation between the streams. These jets can be considered as free, submerged, or confined. A free jet stream is not affected by the walls of a surrounding chamber/vessel nor any surrounding fluid, in contrast to submerged jets where viscous drag forces may be significant. With confined impinging jets, the dimensions of the chamber/vessel relative to jet diameter can play a major role in system performance.

The importance of chamber/vessel dimensions relative to jet diameter is apparent from the micro-mixing time and its relative magnitude compared to the process characteristic time in such jet-based systems. To minimize process sensitivity to mixing, it is generally necessary to reduce the mixing time constant (including macro-, meso-, and micro-mixing) to a fraction of the most significant/relevant process time constant. Length scales are typically used to classify mixing processes, i.e., macro-mixing occurs at vessel dimension scale, meso-mixing is at the turbulent eddy scale, and micro-mixing is on the scale of molecular diffusion in stretching fluid lamellae.

According to apparatus/systems of the present disclosure, high-energy dissipation is observed in the disclosed microreactor designs because the kinetic energy of each stream is converted into a turbulent like motion as the result of the collision and redirection of the flow, e.g., within the very small volume defined by the interaction chamber/microreactor, and the associated shear forces. The size of virtual cylindrical volume elements of exemplary microreactors of the present disclosure may be quantified using computational fluid dynamics (CFD) techniques and has been calculated to be on the order of seven (7) to ten (10) jet diameters for the radial dimension of the impingement plane. The other cylinder dimension (height) has been shown to be independent of jet diameter and the design thereof is typically related to the inter-penetration length of the two jets. In exemplary embodiments of the present disclosure, the height dimension is calculated to be about 10 percent of the inter-nozzle (jet separation) distance.

Interfacial mass transfer area may be used to characterize mixing quality and to quantify associated length scales. Using known transfer areas, diffusion lengths, and physico-chemical properties of fluids that permit measurement of appropriate rate phenomena to determine transport parameters, it is possible to determine an interfacial transfer coefficient, mass diffusivity, and a system characteristic time constant. Coupling these fundamental parameters with system geometric configurations, operating variables and measured performance metrics (such as quantity transported and approach to equilibrium, if not obtained), it is possible to determine transfer areas that must necessarily be present in an interaction chamber/microreactor. In addition, from this interfacial area, it is possible to identify the eddy size scale (i.e., Kolmogorov diffusion length). Consequently, a measure of mixing intensity can be obtained which provides a basis for predicting and/or achieving desired average droplet sizes when generating nano-emulsions and other dispersed systems.

G. Flow Patterns, Mixing and Transport Phenomena

As is readily apparent, it is important to design systems with appropriate hydrodynamic characteristics with respect to transport phenomena and effects on dynamic response (whether chemical reaction kinetics or other rate processes). Beyond system design, process innovations are disclosed herein that (i) utilize flow instabilities for mixing, (ii) improve contacting patterns to enhance interactions that promote better kinetics performance and transport rates, and (iii) improve transport via mechanical turbulence promoters.

EXAMPLES

Example 1

Production of Norfloxacin Nanosuspension Using Solvent/Antisolvent Crystallization at High Shear Rate Conditions Overview:

Hydrophobic active pharmaceutical ingredients (APIs) are often difficult to deliver effectively due to formulation limitations. Nanosuspensions of such drugs may be used to increase bioavailability and offer a variety of delivery options, including inhalation, oral, transdermal and injection. Apparatus, systems and methods of the present disclosure have been used to reproducibly generate sub-micron API suspensions via a continuous process that involves solvent-antisolvent crystallization. This technique of generating a supersaturation state, using a miscible fluid to change solvent composition, is readily implemented commercially. It may also be the best choice economically due to its process intensification character that minimizes unit operation and energy requirements. Consequently, it may be the most environmentally friendly of the various alternatives. Proof of concept experiments were conducted in which nanosuspensions of Norfloxacin (NFN), an antibacterial agent, with median particle sizes in the 170-350 nm range and narrow particle size distributions were produced.

In particular, the disclosed apparatus/system facilitates precise mixing of two (or more) reactant streams within a microliter sized interaction chamber/microreactor, where extremely high levels of shear stress and turbulence are induced. The system design provides precise control of the feed rates and the subsequent location and intensity of the transport and reaction processes. With respect to the crystallization process, this ensures control of the nucleation and growth processes, resulting in uniform crystal growth and stabilization rates. The desired particle size distribution is thus obtained by precise manipulation of the process parameters that established the operational roadmap. Energy input is manifested as fluid pressure at the outlet of the intensifier pump, and subsequent dissipation mechanisms are determined, at least in part, by fluid composition, that is its physico-chemical characteristics. Consequently, the energy input establishes mixing intensity and system temperature through viscous heating, energy transfer to the environment, and the formation and surface energies related to nucleation and growth. The other major control variable is degree of super-saturation as determined by the ratio of solvent and antisolvent streams and system temperature.

Norfloxacin (NFN), which is a highly hydrophobic pharmaceutical, was selected as a model drug to demonstrate the applicability of the disclosed apparatus, systems and methods based on: (a) limited water solubility, (b) availability, and (c) price. The solvent/antisolvent system selected for this model drug was dimethyl-sulfoxide (DMSO) and water. The metrics used to evaluate performance are associated with crystal size, distribution, morphology, and their percent recovery. Light scattering, scanning electron microscopy and x-ray diffraction techniques were used for both qualitative and quantitative analysis of the rod shaped crystals that exhibited very high crystallinity levels. Gravimetric analysis was used for solubility and recovery determinations. The main process variables were system pressure (energy input), feed rates (for solution composition and thus super-saturation ratio), and microreactor design/configuration (which determines shear rates and energy dissipation mechanisms)

Experimental Apparatus and Procedure:

FIG. 3 provides a schematic diagram of a system used in this example. A hydraulic pump transports oil to an intensifier pump that is designed to pressurize the reactant stream(s) to 207 MPa (30,000 psi). Flow through the microreactor is characterized by high fluid velocities inside fixed geometry microchannels. As a result, high intensity shear fields are generated and intense energy dissipation mechanisms, such as turbulence are activated. Under these conditions, mixing of reactants takes place at the nanometer scale within time scales much shorter than chamber residence times. Thus, equilibrium conditions are feasibly obtained, where appropriate. Both multi-phase and single-phase reactions are feasible.

A lab scale, dual feed reaction processor of the type depicted in FIG. 3 was used for the experimental runs described in this Example 1. Two ports located upstream of the interaction chamber permitted introduction of two reactant streams into the intensifier pump. The reactants are coarsely mixed at this point, while the intense mixing advantageously takes place further downstream inside the microreactor.

Of note, for systems/implementations where coarse premixing may be problematic, alternative apparatus/system designs are provided according to the present disclosure that enable the reactant streams to mix for the first time inside the microreactor. These alternative designs are best suited for applications that include very fast processes with selectivity issues due to the multiple time scales present. To suppress the slower process that may form undesired by-product(s), the reactants are first subjected to mixing forces within the interaction chamber. In either case, precise control of individual feed streams is important to obtain desired microreactor performance.

The microreactor design is critical to provide/establish a micro-mixing environment inside a volume/chamber with dimensions at the micro-liter scale. A combination of shear and impact disperse the reactant streams into submicron eddies that intermingle and have very high interfacial/surface area. This promotes rapid development of homogeneous conditions within the micro-liter chamber, since the time scales for micro-mixing (4 μs) and meso-mixing (20 μs) are much smaller than the hydraulic residence time, which is on the order of 1 ms.

The microreactor chamber disclosed herein consists of channels with depth and width in the range of 75-150 microns, which are several times smaller than channels in other impinging jet designs. The microreactor chamber design used for the tests of Example 1 includes channels with minimum dimension of 75 microns. Pressures up to 207 MPa (30,000 psi) are required to drive fluids through the channels. With reference to the schematic depiction of FIG. 3, the combined feed stream was split equally prior to entering the feed channels which feed to the impingement zone.

The fluids accelerate up to 300 m/s, forming two opposing jets that impact one another. As shown in FIG. 2A, the jets collide in a high energy impact zone with sufficient energy to develop the desired dissipation levels. Nominal shear rates developed within the channels may be calculated by assuming a 1-D flow field representation. The deformation rate tensor, composed of the various velocity component special derivatives, is thus approximated as the ratio of the average velocity inside the channels, $u_{avg}$, and the smallest dimension of the channel, $d_{min}$. For a Newtonian fluid, this is related to the nominal shear stress ($\tau$) and the dynamic viscosity of the fluid ($\mu$) as:

$$\left|\frac{\tau}{\mu}\right| = \frac{u_{avg}}{d_{min}}$$

The shear rates for the conditions of the present experiments are estimated to range from $5 \times 10^6$ s$^{-1}$ to $8 \times 10^6$ s$^{-1}$.

The disclosed apparatus/system is advantageously designed to facilitate control of the major thermodynamic and transport mechanisms of a crystallization process, e.g., the target species solubility, super-saturation ratio and energy allocation/dissipation. This control is accomplished by manipulation of: (a) the ratio of the solvent/antisolvent streams, (b) the shear rate and the energy dissipation on the reactants, and (c) the temperature history luring processing.

Thus, in the experimental tests described herein, the ratio of the reactant streams was controlled by using a metering pump system. The total flow rate of the system depends on the design of the microreactor and the process pressure, which determines shear rate and energy dissipation. The temperature history of the fluid is controlled by maintaining the apparatus/system (e.g., the piping) at the desired temperature. Downstream of the microreactor, a heat exchanger is used to reduce fluid temperature, which is elevated during processing as a result of viscous energy dissipation.

When processing a solvent/antisolvent system, the intense mixing results in a homogeneous liquid, i.e., uniform composition down to the Kolmogorov scale and, hence, the super-saturation state is similar throughout the region. Consequently, the resulting crystals are essentially homogeneous in size, degree of crystallinity, and purity, since all crystals form under similar conditions. However, since the process is dependent upon the diffusion process within the Kolmogorov eddies to obtain complete uniformity, minor variations at the molecular level will still lead to slight differences in nucleation rates. Thus, a particle size distribution, albeit narrow, is observed.

Solubility Measurements:

The solubility of NFN (Sigma-Aldrich, US) in both water and water-DMSO (Sigma-Aldrich, US) solutions at 20° C. was determined in batch experiments. Water was mixed with a DMSO-NFN solution of known concentration, while maintaining miscible conditions, to obtain a super-saturation state. The subsequent NFN crystals were permitted to grow for a period of 10 hours to once again reach an equilibrium state, thereby reaching the solubility limit. The crystals were filtered from the liquid, then dried in a vacuum oven for about 10 hours at 90° C., and weighed. The filtered liquid phase was evaporated to dryness and the mass of the solid residue determined gravimetrically. The mass balance of the NFN (total amount recovered/amount dissolved) was also determined to establish precision of the solubility limit estimate. The closure was always greater than 90 percent.

The solubility data were used to estimate super-saturation ratios and the theoretical efficiency of the process, which is defined as the percentage of the drug present in the solvent that precipitates as the solvent and antisolvent streams mix.

Crystallization:

Crystallization experiments were performed using an exemplary reaction processor of the type depicted in FIG. 3. The solvent phase was fed into an intensifier pump using a peristaltic pump. The water phase was placed in the inlet reservoir and gravity fed. The two streams were blended at the inlet to the intensifier pump, noting that a low level of macro-mixing will occur at this process stage.

The total flow rate through the system was controlled by the microreactor design and process pressure. By varying the flow rate through the peristaltic pump at each processing pressure, various mixing ratios of the two streams were achieved. The following solvent-to-water volume ratios were examined: 1:3, 1:4, and 1:10. Equivalently, the water concentrations in the final mixture by weight were 73, 78 and 93%, respectively. A total of 250 ml were processed in each experiment.

In addition to super-saturation, the effect of process pressure, NFN concentration in the solvent stream, and the presence of a surfactant were investigated. Five operating pressures in the range of 68.9 to 138 MPa (10,000 to 20,000 psi) were selected. The concentration of NFN in DMSO varied from 5 to 20 mg NFN/ml DMSO. To determine if a surface active agent could help control particle size, a 1% aqueous solution of Suluton (BASF) was used to replace water as the anti-solvent, the concept being that the hydrophobic group of this amphoteric molecule would interact with the crystal surface at some threshold size, forming a barrier to further transport to and/or along the surface.

To provide appropriate controls for comparison, additional crystal production experiments were conducted by mixing the NFN/DMSO solution with water in a beaker at very low shear conditions. After mixing to obtain uniformity, NFN was allowed to form crystals under quiescent conditions. Size and shape characterization studies were performed. The crystals were then suspended in a saturated solution to conduct particle size reduction experiments under high shear rates using standard Microfluidizer® technology. The purpose was to compare this size reduction process on already grown crystals ("top-down" process) with the in situ process of growing crystal to the desired size with the apparatus/system of the present disclosure ("bottom-up" process).

Material Analysis and Characterization:

Various techniques were employed to analyze and/or characterize the experimental test results described herein.

Particle Size Analysis:

The particle size distribution of the nano-suspensions was measured by two different methods:
(a) Light scattering using a Horiba 910 particle size analyzer: This instrument has a wide dynamic range of between 20 nm-1000 microns.
(b) Dynamic light scattering using a Malvern NanoS particle size analyzer: This instrument has a dynamic range of 0.5 nm-6 microns Scanning Electron Microscopy (SEM):

A Hitachi S-4800 field-emission SEM was used to examine the surface structure and shape of the drug particles and also to verify qualitatively the particle size obtained from the particle size analyzers.

X-Ray Diffration (XRD):

The samples were analyzed using a Rigaku Ultima III diffractometer. XRD analysis was used to investigate the effect of the processing conditions on the crystalline characteristics, i.e., structure, percent of crystallinity and crystallite size of NFN.

Results:

The following results were achieved herein.

Figure 5:
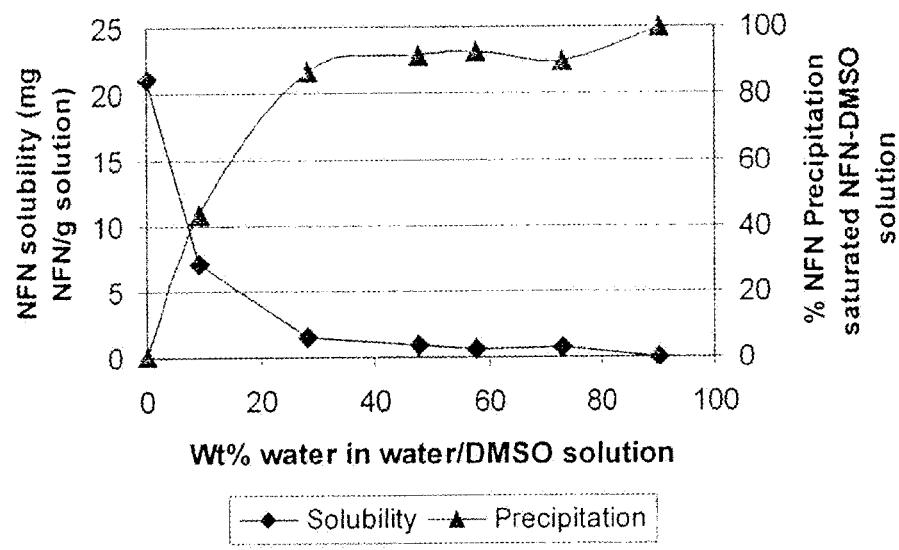
FIG. 5 is a graph depicting solubility of Norfloxacin (NFN) in dimethyl-sulfoxide (DMSO) and water solution as a function of water content and corresponding percentage of NFN that precipitates from the initially saturated NFN/DMSO solution.

Solubility Experiments:

TABLE 1 and FIG. 5 summarize the results obtained in the solubility experiments. Also included is the maximum theoretical yield of the drug as a result of solvent/antisolvent precipitation for this system. The closure of the mass balance of NFN (total amount recovered/amount dissolved) in all of the experiments was greater than 90%.

TABLE 1

Solubility data of NFN in water/DMSO mixtures at 20° C.

| Water Concentration (wt % water in solution) | NFN solubility (mg drug/g solution) | % NFN precipitation from saturated DMSO solution |
|---|---|---|
| 0.00 | 21.00 | 0.00 |
| 9.17 | 7.18 | 43.39 |
| 28.04 | 1.57 | 86.39 |
| 47.62 | 0.86 | 91.43 |
| 57.69 | 0.64 | 92.86 |
| 73.17 | 0.71 | 89.52 |
| 90.19 | 0.00 | 100.00 |

It can be seen from the data set forth in TABLE 1 and FIG. 5 that the solubility of NFN decreases rapidly with addition of water to the DMSO solution. Dilution to 28 wt % water results in a reduction of NFN solubility of over 13 times or, equivalently, results in precipitation of over 86% of NFN from its original equilibrium state. As the amount of water is increased, the amount of NFN that precipitates also increases. At 50 wt % water, about 92% of NFN precipitates, demonstrating that the disclosed "bottom-up" process is highly efficient.

Figure 6:
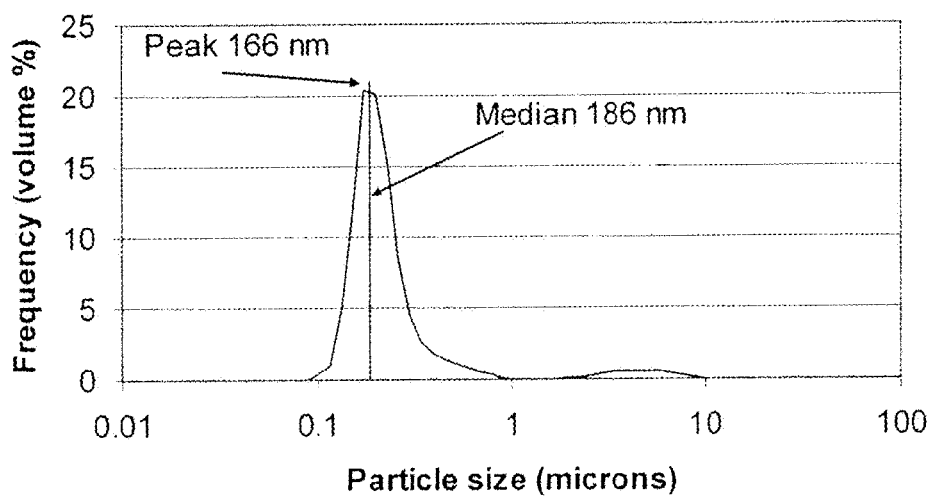
FIG. 6 is a graph depicting particle size distribution of a NFN suspension produced in experimental tests according to the present disclosure.

Crystallization Experiments:

FIG. 6 is a representative sample particle size distribution curve for NFN crystals obtained using the Horiba instrument. This suspension was produced at 138 MPa process pressure, 5 mg NFN/ml DMSO, mixing ratio of DMSO to water of 1:4, and passed through the disclosed processing system twice. The distribution has a median particle size of 186 nm. Most of the material is in the submicron range (peak at 166 nm). A fraction of a percent of the material forms 1 to 10 micron agglomerates.

Figure 7:
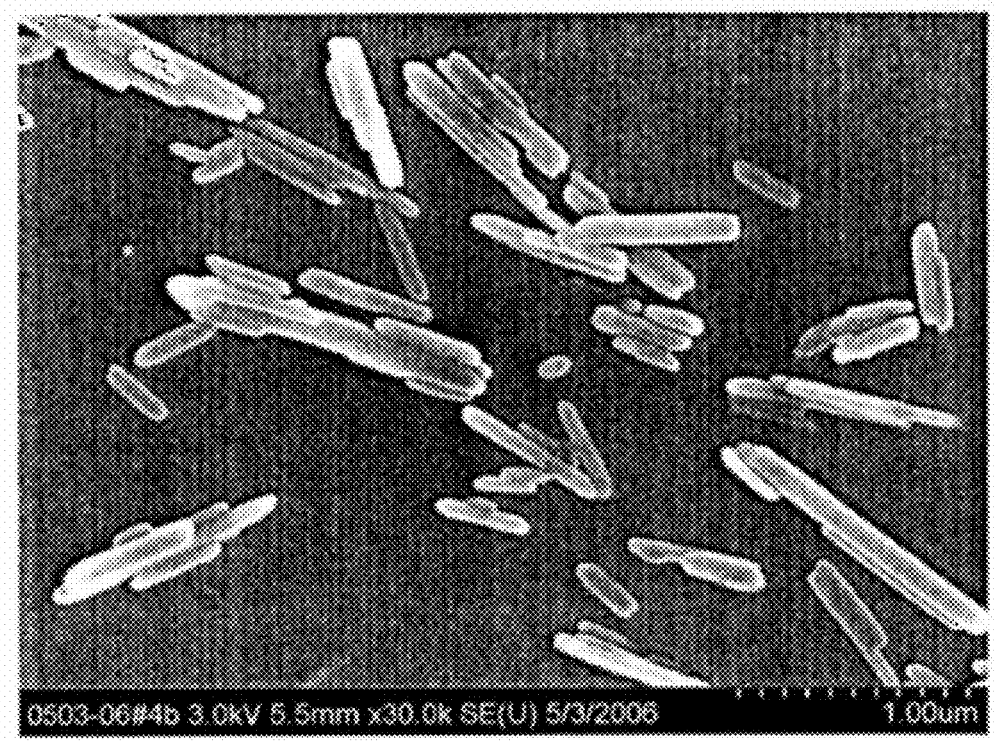
FIG. 7 is an SEM image of a NFN suspension produced in experimental tests according to the present disclosure.

FIG. 7 is an SEM picture of the same NFN crystal material. It can be seen that the particles form needles, 70-100 nm wide and 200-300 nm long. It can also be seen that the particles have a tendency to form agglomerates by attaching to each other along their length axis during the drying process.

Figure 8:
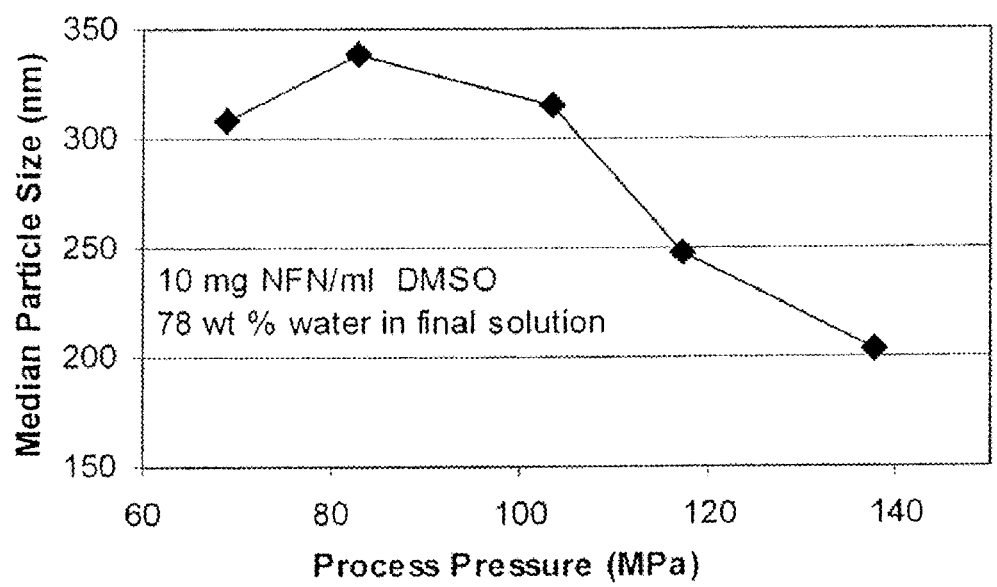
FIG. 8 is a graph depicting the median particle size of NFN as a function of processing pressure for experimental tests run according to the present disclosure.

FIG. 8 shows the "measured" median particle size (as calculated by the instrument software) as a function of process pressure. The initial concentration of NFN was 10 mg/ml of DMSO alone, and the volume ratio of DMSO to water in the final solution was 1:4 (or equivalently 78 wt. % water). The fluid was passed twice through the disclosed processing system. It can be seen that the particle size shows a tendency to decrease with increasing pressure, i.e., from approximately 320 nm at 60 MPa to about 200 nm at 140 MPa.

If the system behaves ideally, then theory states that the "solute free" composition of this miscible solvent/anti-solvent system will not influence the phenomenological events, other than through its impact on super-saturation. That is, concentration can be used as the driving force versus activity as related to free energy. As long as the solution activity coefficient remains constant over the solute free composition range, than the path to the same super-saturation state is irrelevant. To confirm this behavior for the disclosed "bottom-up" system, experiments were conducted in which identical super-saturation ratios were obtained by (i) varying the initial concentration of NFN in DMSO alone and keeping the DMSO/water ratio fixed at 1:4, and (ii) varying the DMSO/water ratio (1:3, 1:4, 1:10) along with the initial NFN concentration, as needed. The results presented in FIGS. 9 and 10 (cases (i) and (ii), respectively) confirm that only the super-saturation ratio need be considered over the range of solute free fluid compositions studied.

Figure 9:
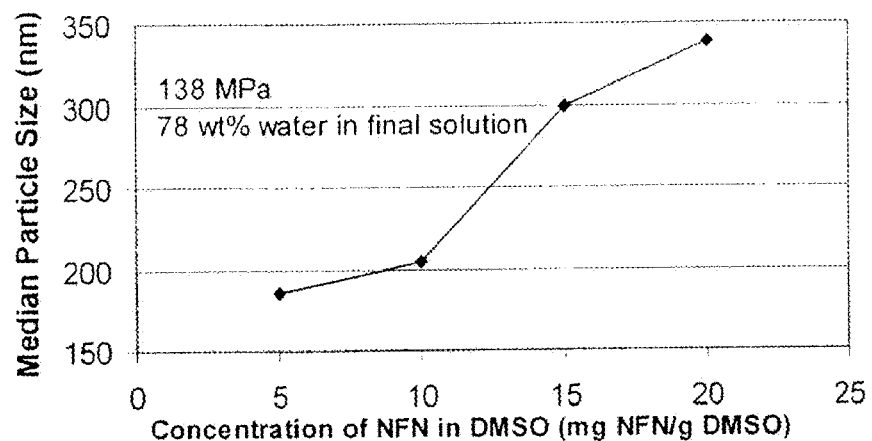
FIG. 9 is a graph depicting median particle size of NFN dispersions as a function of NFN concentration in DMSO for experimental tests run according to the present disclosure.

FIG. 9 shows the median particle size as a function of NFN concentration in DMSO. The process pressure was 138 MPa and the volume ratio of DMSO to water was 1:4 (or equivalently 78 wt. % water in the final solution). The fluid was passed twice through the disclosed processing system. It can be seen that the particle size increases from a minimum of approximately 190 nm at a concentration of 5 mg NFN/g DMSO to nearly 340 nm at a concentration of 20 mg NFN/g DMSO. It is noted that the solubility limit of NFN in DMSO is about 21 mg NFN/g DMSO at ambient temperature.

Figure 10:
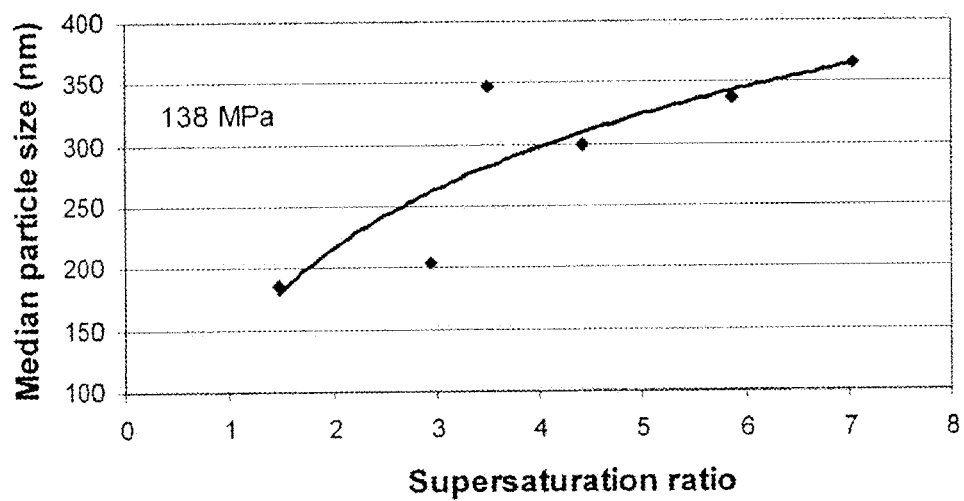
FIG. 10 is a graph depicting particle size as a function of supersaturation ratio at 138 MPa process pressure for experimental tests run according to the present disclosure.

FIG. 10 shows the effect of supersaturation ratio on the particle size when the process pressure is held at 138 MPa (as obtained using both methods). It can be seen that the particle size decreases as the supersaturation ratio decreases over the range of process parameters studied in these experiments. Initially, this result seems inconsistent with the concept that high super-saturation yields small crystals due to the large number of nuclei formed under these conditions. However, the high shear rates and resultant micro-mixing conditions essentially eliminate the mass transfer controlled kinetics mechanism for growth, thereby establishing interfacial attachment kinetics as the controlling mechanism. The rate of growth is thus higher for higher super-saturation conditions (more cluster attachment). Since the scale for the mixing events are identical in these experiments as reported in FIGS.

9 and 10, the plateau particle size, albeit still at the nanoscale, is larger.

Figure 11:
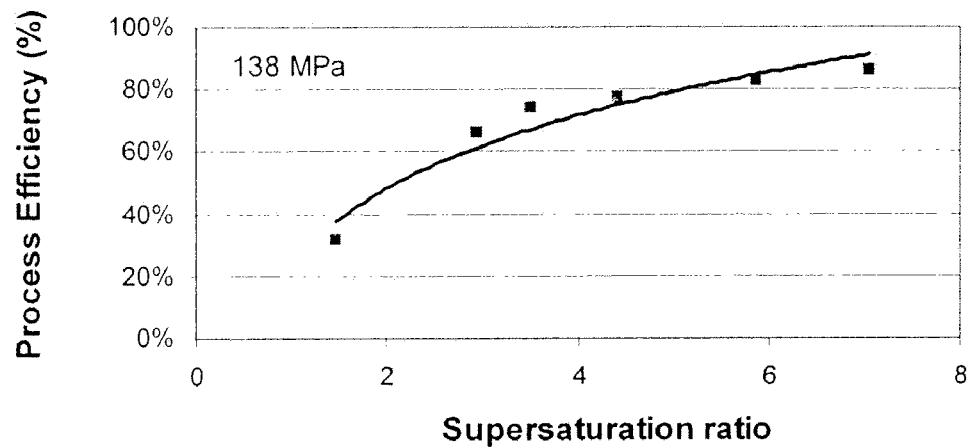
FIG. 11 is a graph depicting process efficiency as a function of supersaturation ratio at 138 MPa process pressure for experimental tests run according to the present disclosure.

The effect of supersaturation ratio on the theoretical efficiency of the process at 138 MPa is shown in FIG. 11. The theoretical efficiency corresponds to the percentage of NFN that precipitates as a result of solubility change. In the present examples, the theoretical efficiency increases from 32% at a supersaturation ratio of about 1.5 to 85% at a ratio of about 7.

Figure 12:
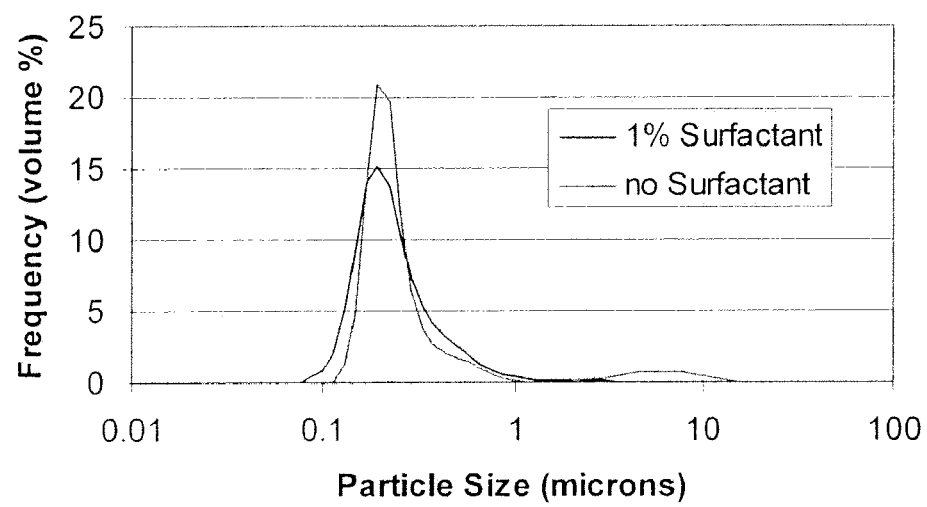
FIG. 12 is a graph depicting the effect of surfactant on particle size distribution of particles from an exemplary recrystallization experiment according to the present disclosure.

The anticipated role of a surfactant was not realized in the disclosed systems, as is shown in FIG. 12. The particle size distribution with and without introduction of Suluton surfactant is similar. In particular, the median particle size varied from 204 nm to 209 nm, respectively. The main peak of the distribution is in the same location in both cases. However, there is a secondary population of agglomerates in the sample without surfactant with sizes 1-10 microns. This population of particles is significantly smaller in the sample that contains surfactant.

Figure 13A:
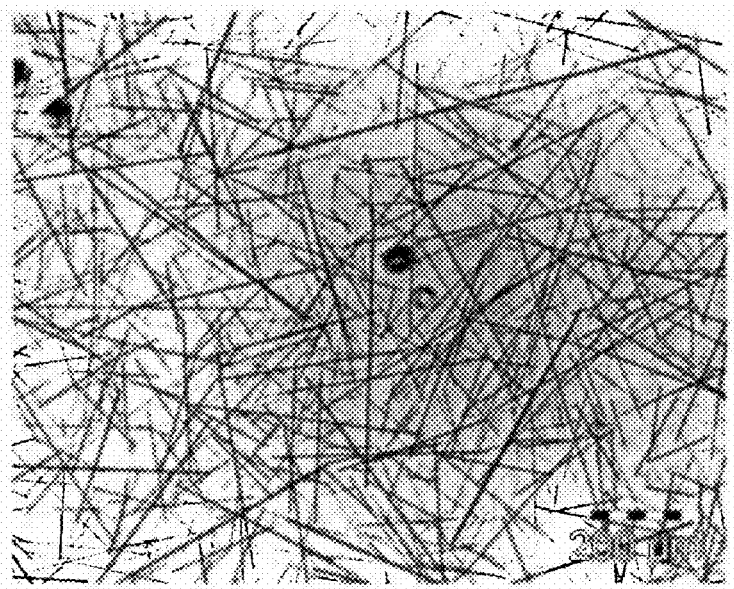
Figure 13B:
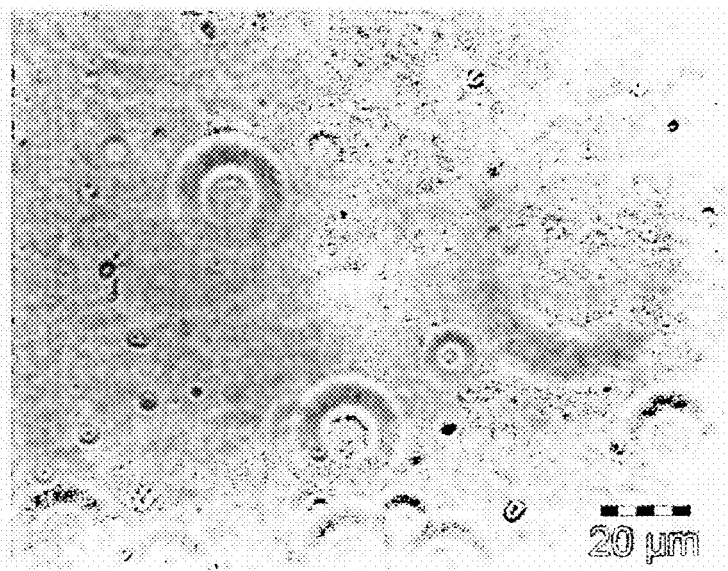

Particle Size Reduction with High Shear Processing:

To provide a basis for validation, standard particle reduction experiments (i.e., "top-down" processing) were performed. Crystallization of the NFN in a low shear environment produced long, narrow particles (see FIG. 13A). The particles were up to 1 mm long and were 1 to 3 microns wide. After the particles were grown, the dispersion was processed in a standard Microfluidizer® unit equipped with a high shear interaction chamber. Applying these high shear conditions for 30 passes using an H30Z (200 microns)-G10Z (87 microns) chamber configuration at 207 MPa, the crystals were reduced to a median particle size of 428 nm (see FIG. 13B). This is essentially twice the median particle size of crystals produced using the advantageous apparatus, systems and methods of the present disclosure ("bottom-up" processing), which required only two passes through the system.

Figure 14:
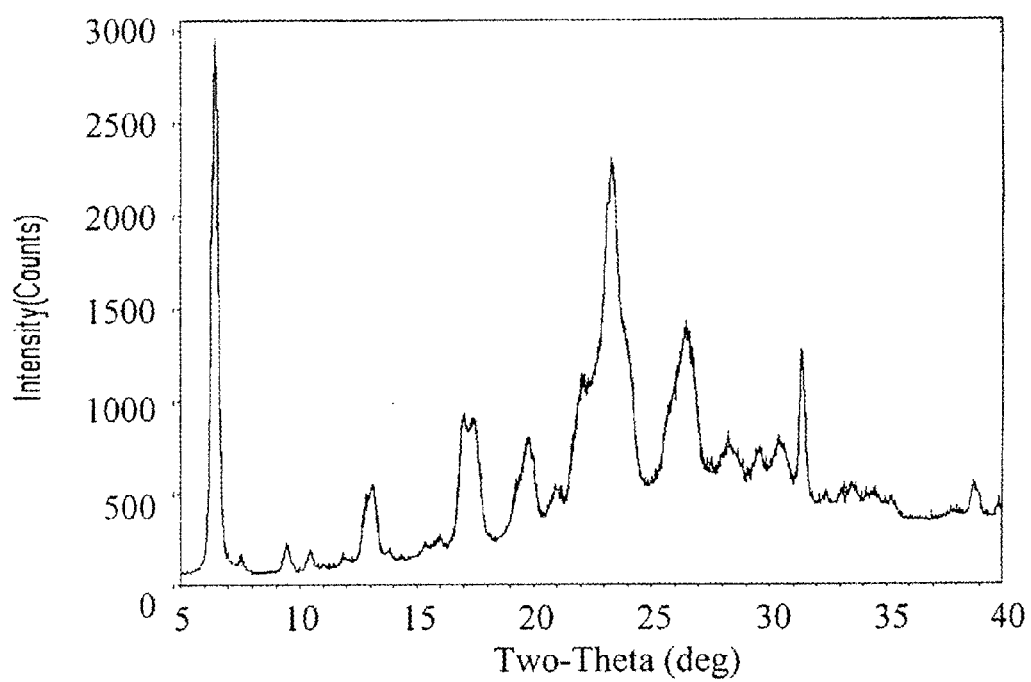
FIG. 14 shows diffraction patterns for samples that were crystallized using the DMSO/water solvent/anti-solvent system in experimental runs.
Figure 15:
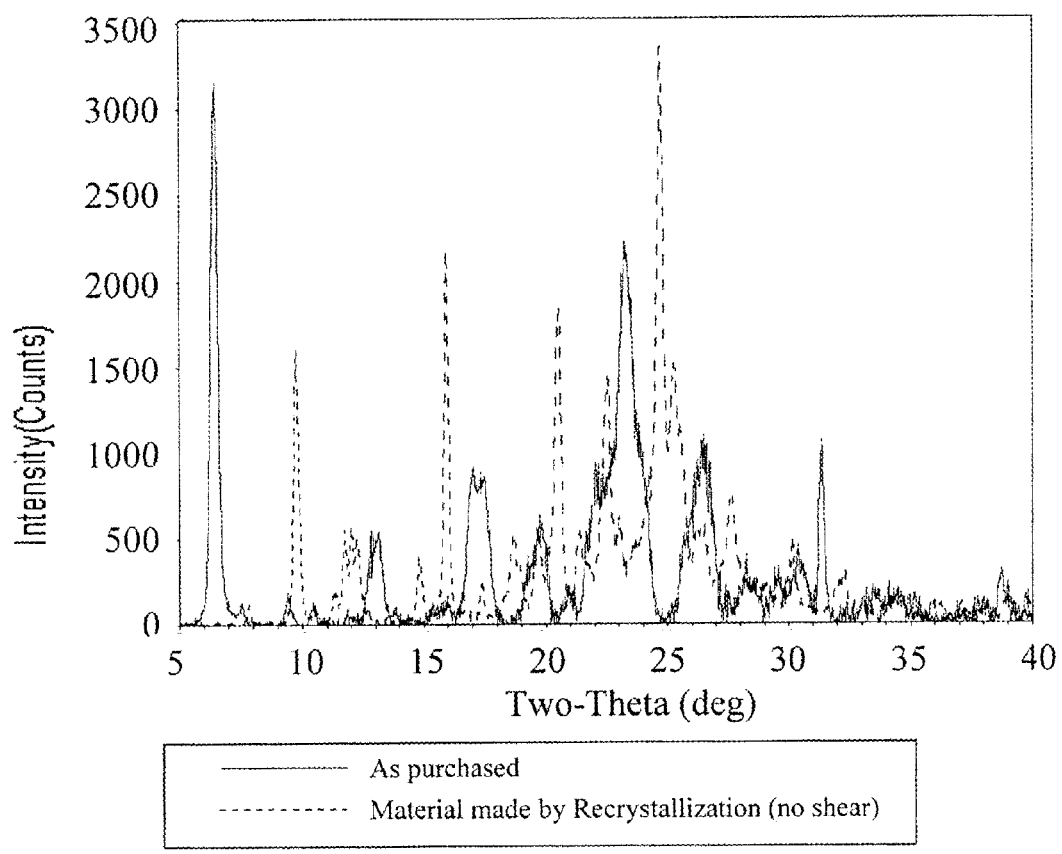
FIG. 15 shows diffraction patterns for NFN as purchased.

XRD Analysis:

The XRD spectra of NFN crystal samples that were produced from the DMSO/water system under all processing conditions showed no statistically significant differences. These samples included NFN nanoparticles that were produced using the apparatus, systems and methods of the present disclosure, as well as NFN needles that were prepared at low shear and at no shear at all. The XRD spectra are shown in FIG. 14. NFN as purchased shows a different XRD pattern, as seen in FIG. 15.

The percent crystallinity and average crystallite sizes are given in TABLE 2. The results indicate that the shear rates during crystallization affect both the percent of crystallinity and the crystallite size, and that each are highest at no shear. The percent of crystallinity decreases slightly from 85% to 78% as shear is applied during crystallization. The crystallite size changes dramatically from 727 Å at no shear to 239 Å at high shear conditions.

TABLE 2

Percent of crystallinity and average crystallite sizes as measured by XRD

| Sample | Percent Crystallinity (±4%) | Average Crystallite Size (Å) |
| --- | --- | --- |
| As purchased | 84.1 | 441 |
| Re-crystallized (no shear) | 85.1 | 727 |
| Re-crystallized (low shear) | 77.8 | 275 |
| Re-crystallized (high shear) | 79.7 | 239 |

Discussion

Segregation of the solvent and antisolvent streams until immediately before the high shear mixing zone was critical in producing NFN nanosuspensions. It is reasonable to assume that the bulk of nuclei form after intense mixing takes place within the microreactor of the disclosed apparatus/system. Some nuclei may also form inside the intensifier pump prior to the microreactor chamber. However, mixing inside the microreactor is at the nanometer scale, while the limited mixing that occurs inside the intensifier pump is at a scale that is orders of magnitude larger. Therefore, the nucleation rate should be much higher inside the microreactor than in any other location in the system—where mixing is not at that scale.

Crystal growth takes place after nucleation. As noted above, in crystallization processes, a large concentration of nuclei formed under high super-saturation conditions usually results in small size particles. Also in crystallization processes, high shear limits crystal growth due to "mechanical" forces exceeding cohesive and interfacial forces. In this case, the combination of large concentration of nuclei and high shear yield NFN nanoparticles.

Originally, the purpose of using a surfactant was to coat the particles so crystal growth slowed down. However, the surfactant that was used did not have any effect on primary particle size in the present experiments. It is possible that the solubility of the surfactant in the DMSO/water mixture was high enough so that the surfactant remained in solution instead of coating the particles and/or that highly stable micelles formed once the solubility limit was exceeded (i.e., critical micelle concentration). Surface tension and interfacial energy associated with these self-assembly processes play a significant role. Another possibility is that the crystal growth was faster than the coating process and an activation energy difference/barrier also contributed.

The crystalline structure of NFN did not vary with the shear rate that was applied to the fluid or with the supersaturation ratio. However, the crystalline structure of NFN crystals produced according to the present disclosure did differ from the crystalline structure of NFN, as purchased. It is possible that the crystalline structure of NFN produced by the disclosed apparatus/system and method is related to the solvent/antisolvent fluid system used for crystallization. The percent crystallinity did not appear to be a strong function of shear rates. In contrast, the crystallite size is significantly reduced with an increase in shear rates.

Summary:

The disclosed apparatus, system and method can be used to effectively produce nanosuspensions from a broad range of active pharmaceutical ingredients (APIs). The choice of solvent and antisolvent system is critical, since it will control the solubility of the API, hence supersaturation, which is the driving force of crystallization. There may be systems in which the crystallization process is fast, such that the API crystallizes before entering the microreactor. However, alternative embodiments of the disclosed apparatus/system—which are designed to keep the two reactant streams separate prior to entering the microliter volume of the microreactor—may be advantageously employed in such circumstances.

More particularly and as demonstrated by the experimental results reported herein, the disclosed apparatus, system and method were successful in producing NFN nanosuspensions using a continuous solvent/antisolvent crystallization process. The disclosed technology provides intense mixing of the streams in a microliter size volume, ensuring that a micromixing scale is advantageously reached. In addition, limited mixing of the two reactant streams occurred prior to entering the microliter microreactor. Consequently, only Kolmogorov length scale diffusion determines system performance and nanometer particles are formed.

The solvent/antisolvent system included two miscible fluids, DMSO as the solvent and water as the antisolvent. The formed particles were needle shaped, 70 to 100 nm wide and 200 to 300 nm long. The median particle size, as measured by laser scattering, varied in the range of 180 to 400 nm.

The effect of process pressure (determining energy input), the NFN concentration, the supersaturation ratio and the presence of surfactant on the particle size and the crystallized material were investigated. Higher pressures resulted in smaller particle sizes, as did lowering NFN concentration and supersaturation ratios. The surfactant that was used (Solutol) did not affect the particle size. The crystalline structure of the material formed in the DMSO/water system was not affected by the shear rate of the process. However, the crystallite size of the material decreased threefold when comparing no-shear crystallization to high shear crystallization.

The theoretical efficiency of crystallization, as calculated based on the solubilities of NFN in DMSO/water, varied in the range 38 to 83%, dependent upon the increasing magnitude of the supersaturation ratio. Lower values of this ratio resulted in smaller particles, but at the expense of lower rates and efficiencies.

Example 2

Production of Stable Drug Nanosuspensions According to the Present Disclosure (Extension of Example 1)

Several active pharmaceutical ingredients (APIs) were tested to further demonstrate the efficacy of the disclosed apparatus, systems and methods. The median particle sizes of suspensions produced by the apparatus/systems of the present Determination of Solubilities:

The approximate solubilities of the APIs in the solvent and various solvent/antisolvent solutions were determined, whenever possible. It was not possible to obtain solubility data for all APIs and/or at all conditions of interest, primarily due to inadequate quantities of such APIs. In such cases, simple tests were conducted by mixing solutions of APIs with the antisolvent to ensure adequate precipitation, as described below.

Crystallization Experiments:

Crystallization experiments using the disclosed apparatus/system were conducted at 138 and 83 MPa (20,000 and 12,000 psi) process pressures. The reaction chamber that was used had a minimum channel dimension of 75 microns. The solvents were either dimethyl sulfoxide (DMSO) or N-Methyl-2-Pyrrolidone (NMP), and the antisolvent was water (see TABLE 3). Of note, alternative solvents include methanol, ethanol, acetone, dichloromethane, octanol and isopropyl alcohol, and alternative antisolvents include hexane and heptane. The water volume flow rate was typically 3-10 times the solvent volume flow rate, resulting in supersaturation between 1.4 and 9.

Whenever the solubilities were known, the solvent to antisolvent ratio was determined by the supersaturation. When the solubilities were not known, a test was conducted which involved adding water to an API solution to determine conditions under which a substantial amount of the API had crystallized and precipitated. This condition was then modified (as seen fit) based on the results of the crystallization experiments.

A surfactant was added to the antisolvent (water) in order to: (a) stabilize the nanoparticles and limit their growth, and (b) minimize agglomeration of the particles and to thereby create a stable suspension. Two non-ionic surfactants were used, Solutol® HS 15 (polyoxyethylene esters of 12-hydroxystearic acid; Bayer) and a hydrophobically modified inulin polymeric surfactant, INUTEK SP1 (Orafti).

TABLE 3

| API | Function | Solvent (Sol) | Antisolvent (AS) | Ratio (AS)/(Sol) | API conc. in solvent (mg/ml) | Surfactant | Process Pressure (MPa) |
|---|---|---|---|---|---|---|---|
| Azithromycin | Antibiotic | DMSO | Water | 4 | 75 | Solutol | 138 |
| Oxycarbazepine | Anti-convulsant | DMSO | Water | 4 | 40 | Solutol | 138 |
| API-1 | NSAIS | NMP | Water | 5 | 50 | Solutol/None | 83 |
| API-2 | Antibiotic | DMSO | Water | 3-10 | 5-20 | Solutol/None | 138 |
| Loratadine | Antihistamine | NMP/DMSO | Water | 4 & 10 | 40 & 100 | Solutol/INUTEK | 138 | disclosure varied in the range of 50-767 nm. The suspensions were stable with a single exception. For certain APIs, the process efficiency exceeded 80%.

As opposed to conventional "top-down" methods for manufacturing nanosuspensions, which primarily rely on reducing particle size of drug powders in dry or wet formulations, exemplary embodiments of the present disclosure employ "bottom-up" processing using solvent and antisolvent crystallization to produce drug nanosuspensions. The disclosed "bottom-up" processes allow the formation and stabilization of nanosuspensions without the need for size reduction. More particularly, the disclosed apparatus/system and associated "bottom-up" processing provide precise control of feed rate and mixing location of reactants, thereby ensuring control of nucleation and growth processes and resulting in uniform crystal growth and stabilization rates.

The disclosed "bottom up" process for producing nanosuspensions was compared to a typical "top down" process. As a typical "top down" process, the standard Microfluidizer® technology was selected. This technology is routinely used for particle size reduction of dispersions and emulsions in a variety of industries, including the pharmaceutical industry.

For the "top down" control experiments, suspensions of micron size crystals were processed with a conventional Microfluidizer® high shear processor. These crystals had been grown under no shear conditions by pouring the solvent and antisolvent streams into a beaker and then allowing the crystals to grow without stirring the fluids.

Five different model APIs were used for testing, as listed in TABLE 3. The APIs were selected from different chemical families and exhibited different pharmacological activities. In particular, there were two antibiotics (azithromycin and API-2), an antihistamine (loratadine), an anticonvulsant (oxycarbazepine) and a non-steroidal anti-inflammatory (NSAIS, API-1). The molecular weights of the APIs were in the range of 228-749.

Material Characterization:

Material characterization was performed in the same manner as described above with reference to Example 1.

Results:

TABLE 4 sets forth the results from crystallization experiments for the noted APIs. Particle size and shape, the measuring/visualization methods and details of the crystallization process are also set forth in TABLE 4.

With further reference to TABLE 4, crystallization of API-1 using the apparatus/system of the present disclosure resulted in stable nanosuspensions with median particle size of 400 nm, as determined by SLS. The presence of surfactant, Solutol, did not affect the primary particle size of the suspension, but it reduced the propensity of the particles to agglomerate.

Crystallization of API-2 using the apparatus/system of the present disclosure resulted in stable nanosuspensions with median particle sizes of 166-312 nm, as determined by SEM and SLS. Similarly to API-1, the presence of surfactant (Solutol) did not affect the primary particle size of the API-2

TABLE 4

| API | Median Particle Size (nm) | Measurement Method | Shape | Stability | Surfactant (Solvent) | Processing Method |
|---|---|---|---|---|---|---|
| Azithromycin | 50-100 | TEM/DLS | Spheroidal | Stable | Solutol | Disclosed System |
| Oxycarbazepine | 767 | SLS | Unknown | Stable | Solutol | Disclosed System |
| Oxycarbazepine | 5000 × 20,000 | SLS | Needle | Stable | Solutol | Control |
| Oxycarbazepine | 1200 | SLS |  | Stable | Solutol | Control with site reduction after 25 passes |
| API-1 | 397 | SLS | Unknown | Stable | Solutol/None | Disclosed System |
| API-2 | 166-312 | SEM/LS | Needle | Stable | Solutol/None | Disclosed System |
| Loratadine | 183 | DLS | Unknown | Very unstable | Solutol (NMP) | Disclosed System |
| Loratadine | 379 | DLS | Needle | Rather unstable | INUTEK (NMP) | Disclosed System |
| Loratadine | 90 | DLS | Unknown | Very unstable | Solutol (DMSO) | Disclosed System |
| Loratadine | 332 | DLS | Needle | Rather unstable | INUTEK (DMSO) | Disclosed System |

Figure 16:
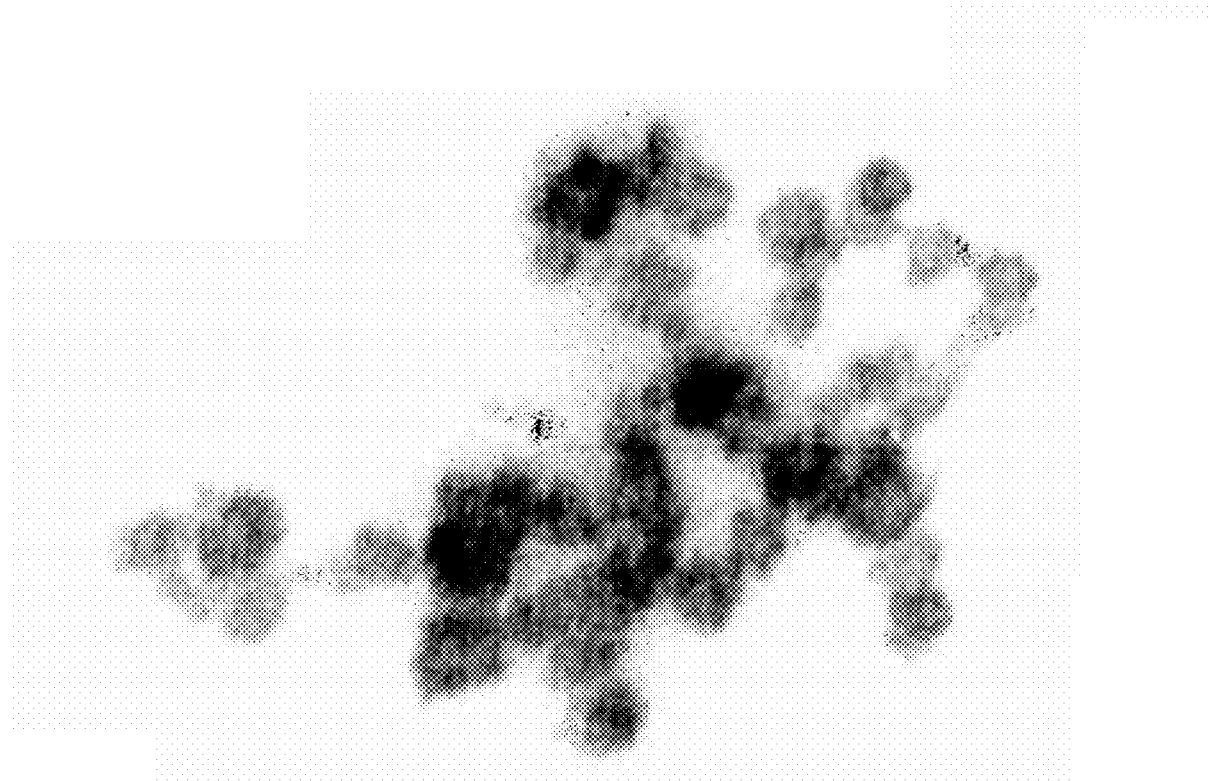
FIG. 16 is a TEM image of azythromycin particles produced with the disclosed apparatus/system.

As shown in TABLE 4, crystallization of azithromycin using the disclosed apparatus/system resulted in a nanosuspension with median particle size of 50-100 nm. The particle size was measured using DLS and was confirmed by TEM (see FIG. 16). The nanosuspension was stable both in the solvent and antisolvent mixture, and in water after the solvent was removed.

As also shown in TABLE 4, crystallization of oxycarbazepine using the disclosed apparatus/system resulted in stable nanosuspensions with median particle size of 767 nm, as determined by SLS. The particle size distribution was bimodal, with a peak at about 340 nm and another at about 1 micron. It is possible that the smaller particle population is a result of crystallization taking place inside the reaction chamber. The larger particle population may be a result of crystallization starting prior to the interaction chamber. Finally, about 5% of the particles by volume were in the range of 2.5-6 microns.

In contrast, crystallization of oxycarbazepine under control conditions (beaker) resulted in needles having lengths of about 20 microns and widths of about 5 microns. The particle size of the control oxycarbazepine sample was reduced using a standard Microfluidizer® processor ("top-down" process). The median particle size of the sample was reduced to 1.2 microns after 25 passes through the processor. The processed sample contained a population of about 5% of particles with sizes in the range of 4-6 microns. Therefore, smaller particles were advantageously produced using the apparatus/system of the present disclosure in a single step as compared to conventional "top-down" processing that included reducing the particle size in multiple (25) steps.

suspension. The median particle size of API-2 and the process efficiency decreased as supersaturation decreased from about 8 to 1.4. The efficiency varied in the range of 32% and 83%.

Loratadine exhibited very different behavior than all other APIs tested herein. Submicron particles were formed immediately after using the apparatus/system of the present disclosure or mixing the solvent and antisolvent streams in a beaker. However, the suspension was unstable since the particles grew, sometimes during particle size measurements.

Different surfactants and solvents were investigated in an effort to increase the stability of the loratadine suspension. When Solutol was used as a surfactant, the initial particle size was about 90 nm, but a reproducible particle size measurement was difficult or impossible to achieve. This was true with both solvents that were tried, DMSO and NMP. When INUTEK was used as a surfactant, the resulting particle size was larger, on the order of 332-379 nm. However, the stability of the particles was much higher.

Overnight, the loratadine particles that were produced with the apparatus/system of the present disclosure formed uniform needles that were 10-20 microns long and 0.5-2 microns wide. The particles that were produced with the control method formed needles of hundreds of microns in length and tens of microns in width.

Summary:

The apparatus, system and method of the present disclosure provides a continuous and scalable microreactor technology. High pressures force liquid reactants to form jets with velocities up to 400 m/s. The jets experience/encounter high shear fields in a microliter scale volume, forcing the reactants to mix at the nanometer scale, minimizing diffusion limitations.

The disclosed apparatus/system was successfully used to produce nanosuspensions of model APIs using solvent/antisolvent crystallization. The median particle size varied in the range of 50-767 nm. The suspensions were stable after production, with a single exception. The stability of the less stable suspension could be influenced by surfactant selection. In addition, the disclosed "bottom-up" processing method was demonstrated to be more effective in producing nanosuspensions than standard, particle size reducing ("top-down") methods.

Example 3

Exemplary Roadmap Application—Preparation of Nanoparticles for Drug Delivery The present disclosure may be employed to identify, develop and implement processing roadmaps for various applications. For example, roadmaps for drug crystallization may be developed as follows: (i) determine solvent, antisolvent and surfactant constituents based on applicable input criteria, e.g., solubilities, toxicities, compatibility and screening experiments; (ii) introduce the selected solvent, antisolvent and surfactant constituents to the disclosed apparatus/system to produce advantageous nanosuspensions based on applicable process variables, e.g., microreactor chamber design, pressure and supersaturation ratio; and (iii) purify the nanosuspension (if required) to recover crystallized drug, e.g., using centrifuge, filter, rinsing and/or lypholization techniques. The disclosed roadmaps may be used to yield crystallized particles characterized by desired particle sizes and particle size distributions.

More generally, roadmaps may be developed and implemented for various processing regimens according to the present disclosure. Exemplary methods may involve, inter cilia:

a. Identifying a solvent or first reactant/continuous phase, and an antisolvent or second reactant/dispersed phase which together define a process stream;

b. Determining need for surfactant(s) to achieve desired stability/control of process stream;

c. Determining concentration of target molecule/species or reactants within solvent or process stream/dispersed phase, and ratio of solvent/antisolvent or reactants/continuous phase/dispersed phase to achieve a predetermined level of supersaturation or contact efficiency/efficacy to drive relevant mechanism, e.g., crystallization mechanism, reaction mechanism, emulsion mechanism, coating mechanism, etc.;

d. Introducing predetermined amount(s) of energy to the process stream;

e. Regulating energy dissipation mechanism(s) at specified locations within system;

f. Contacting the solvent/antisolvent, reactants or continuous/dispersed phases in a confined volume at a nanoscale so as to deliver product of a desired characteristic, e.g., products having a desired particle size distribution, morphology, composition and/or combinations thereof.

In this exemplary application of the roadmap design, development and implementation, a processing regimen for generation of poly(epsilon-caprolactone) nanoparticles for use in drug delivery was undertaken. A solvent/antisolvent system of acetone and water was selected and, as set forth in Table 5 below, processing parameters were identified/developed for such processing regimen.

TABLE 5

Poly(Epsilon-Caprolactone) Nanoparticle Processing

| Test | Solvent/ Antisolvent Volume Ratio | Polymer Concentration in Solvent (mg/ml) | Pressure | Passes | Particle size (microns) |
|---|---|---|---|---|---|
| 1 | 9 | 20 | 4000 | 2 | 5.273 |
| 2 | 9 | 20 | 4000 | 2 | 7.974 |
| 3 | 9 | 20 | 14,000 | 2 | 0.477 |
| 4 | 9 | 40 | 14,000 | 2 | 1.177 |
| 5 | 9 | 10 | 14,000 | 2 | 0.439 |
| 6 | 9 | 20 | 20,000 | 2 | 0.395 |

Figure 17:
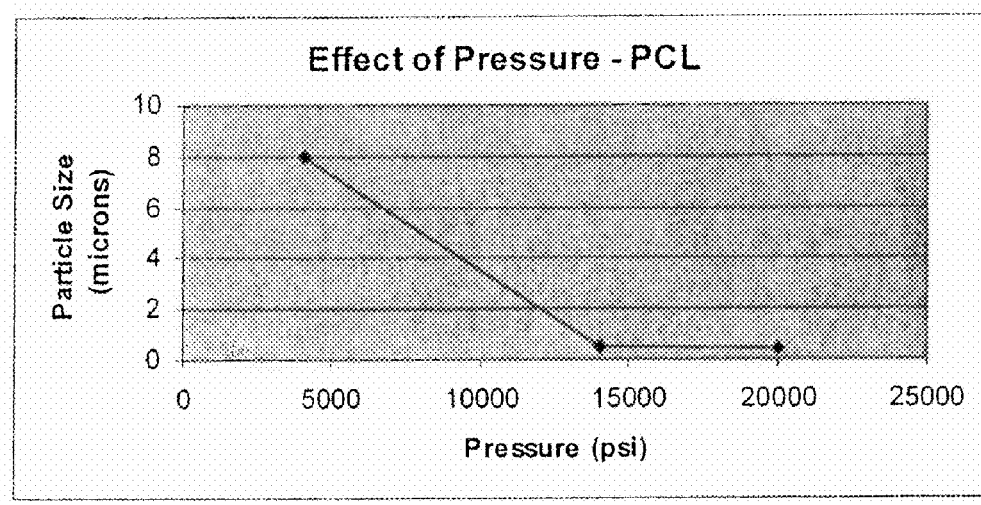
FIGS. 17 and 18 are plots of particle size relative to pressure for an exemplary implementation of the present disclosure.
Figure 18:
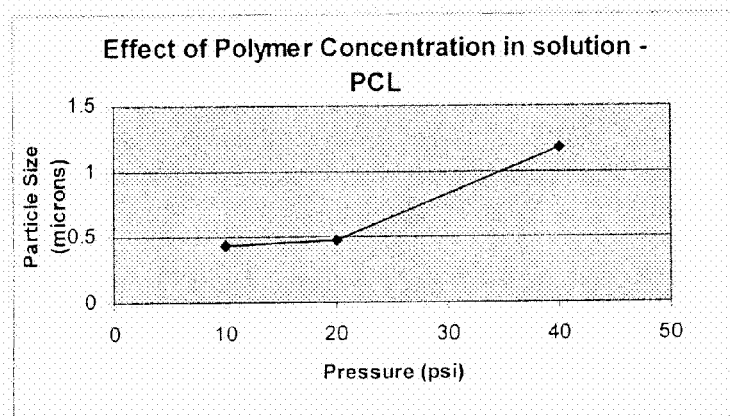
Figure 19:
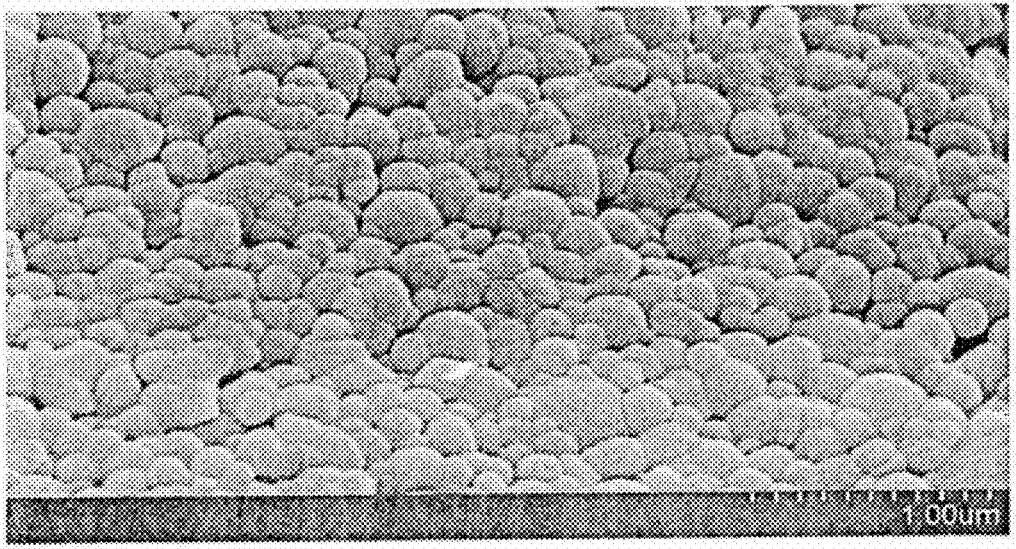
FIG. 19 is an image of poly(epsilon-caprolactone) nanoparticles produced according to an exemplary implementation of the present disclosure.

With reference to FIGS. 17 and 18, the effects of pressure and polymer concentration are depicted for the exemplary poly(epsilon-caprolactone) nanoparticle processing is shown. Utilizing the roadmap technique described herein, processing of poly(epsilon-caprolactone) nanoparticles using an interaction chamber/microreactor as schematically depicted in FIG. 1 was effective in producing nanoparticles having a median particle size of 239 nm, as shown in FIG. 19.

With reference to the roadmap steps outlined herein, it is noted that in this exemplary application, the roadmap was implemented as follows:

Identifying a solvent or first reactant/continuous phase, and an antisolvent or second reactant/dispersed phase which together define a process stream:
 Solvent: acetone
 Antisolvent: water
Determining need for surfactant(s) to achieve desired stability/control of process stream:
 No surfactant employed
Determining concentration of target molecule/species or reactants within solvent or process stream/dispersed phase, and ratio of solvent/antisolvent or reactants/continuous phase/dispersed phase to achieve a predetermined level of supersaturation or contact efficiency/efficacy to drive relevant mechanism, e.g., crystallization mechanism, reaction mechanism, emulsion mechanism, coating mechanism, etc.:
 Polymer concentration in solvent of between 10 to 40 mg/ml;
 Ratio of solvent to antisolvent: 9:1
Introducing predetermined amount(s) of energy to the process stream:
 Pressure: 4000 to 20,000 psi
 Number of Passes: 2
Regulating energy dissipation mechanism(s) at specified locations within system; Contacting the solvent/antisolvent, reactants or continuous/dispersed phases in a confined volume at a nanoscale so as to deliver product of a desired characteristic, e.g., products having a desired particle size distribution, morphology, composition and/or combinations thereof:
 Nanoparticles formed in microreactor with minimal energy dissipation prior to entry of solvent/antisolvent into microreactor.
 Particles having desired particle size distribution generated.

Example 4

Proposed System Dynamics for Biodiesel Synthesis

Figure 20:
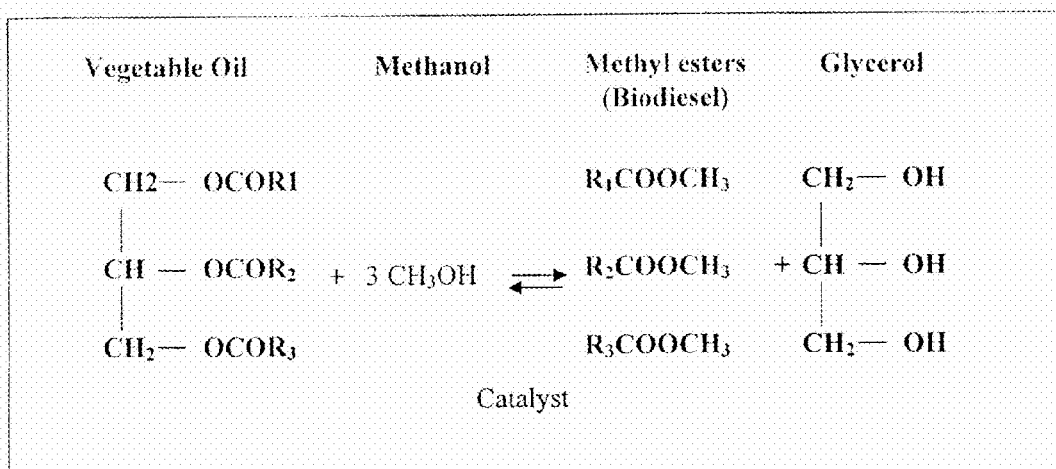
FIG. 20 is a schematic depiction of a reaction scheme for biodiesel synthesis.

Biodiesel may be produced by the transesterification of vegetable oil. The most common vegetable oils used are soybean oil and rapeseed oil. The reaction is a three-step catalytic, reversible reaction. For each mole of the triglyceride (TG) reactant (i.e., three fatty acid side groups), three moles of methanol are required to produce three moles of the specific fatty acid methyl esters (FAME, identified as "biodiesel"), and one mole of glycerol (G, the byproduct). However, the reaction is carried out in an excess of methanol (6:1 molar ratio methanol to vegetable oil) in order to drive the reaction in the forward direction. The primary reaction scheme is shown in FIG. 20.

Typically, the catalyst is sodium hydroxide or sodium methoxide. In either case, the ion responsible for the catalytic action is the methoxide ion. When sodium hydroxide is used, the methoxide ion is generated in situ by reaction with methanol. The reaction mechanism for alkali-catalyzed transesterification was formulated as three steps (Ma, F., Hanna, M. A., "Biodiesel production: a review", Bioresource Technology, 70, 1-5, (1999)). The key step is the formation of an activated complex between the TG molecule and the methoxide ion catalyst, thereby promoting selective conversion of TG versus the free fatty acids (FFA). The much slower, non-catalytic reaction involving FFA forms undesired side products ("soaps") that act as surface active agents stabilizing any emulsion formed and thus generating downstream processing problems.

Since an important factor in accelerating the desired reaction is the degree of mixing between the alcohol and triglyceride phases, which are immiscible, the formation of a large interfacial area is sought. Unfortunately, this can also be problematic if the side reaction is not sufficiently suppressed. An environment that eliminates transport resistances and thus permits the process to progress at its intrinsic kinetics rates can overcome this problem. Since the desired rate will now be much greater than the undesired, the reactants are consumed before they can follow the other pathways within this reaction network and/or the system can be quenched in some manner once sufficient conversion of desired product is obtained. Furthermore, the need for this large transfer area is required for only an initial lag period.

Accordingly, the important reaction events should proceed as follows. First, the catalyst dissolves in the methanol phase and hence the reaction is limited by the oil concentration in that phase (Vicente G., Martinez, M., Aracil, J., Esteban, A., "Kinetics of sunflower oil methanolysis", Industrial and Engineering Chemistry Research, 44, 5447-5454, (2005)). Thus, there is an initial mass transfer limited region in which efficient contact of the two phases has to be achieved. In this stage, the reaction occurs at the interface (Boocock, D. G. B., Konar, S. K., Mao, V., Sadi H., "Fast one-phase oil-rich processes for the preparation of vegetable oil methyl esters", Biomass and Bioenergy, 11, 43-50, (1996)). The glycerol that is formed diffuses into the methanol phase and the FAME diffuses into the oil phase. As the mass fraction of FAME increases, the solubility of methanol in the FAME+oil phase increases (Zhou H Lu H., Liang B., "Solubility of multicomponent systems in the biodiesel production by transesterification of *Jatropha cucras* L. oil with methanol", Journal of Chemical Engineering Data, 51, 1130-1135, (2006)). The ternary mixture of FAME+oil+methanol becomes a homogeneous solution when the mass fraction of FAME increases to around 60-70%. The reaction now takes place in this homogeneous phase.

It should be noted however that the reaction mixture is still heterogeneous. Since the solubility of glycerol in FAME and methanol is low (Thou et al., 2006), the glycerol remains as a separate phase and the methanol partitions between the glycerol and FAME phases. In order to model the kinetics of the reaction in the homogeneous phase, it is necessary to have data on how the methanol partitions between the FAME and glycerol phases. Note also that if significant surfactants have been generated, the separation of these two immiscible product phases is now difficult, requiring emulsion breaking techniques and associated vessels.

Kinetics of the Biodiesel Reaction:

Rate constants have been reported for the transesterification of soybean oil with methanol at a catalyst (NaOH) concentration of 0.2% and a temperature of 50° C. (Noreddini, H., Zhou, D "Kinetics of transesterification of soybean oil", Journal of the American Oil Chemists' Society, 74, 1457-1463, (1997)). These rate constants were calculated from experiments performed in a 1500 mL glass cylindrical reactor equipped with a mechanical stirrer. The rotational speed at which the measurements were conducted was 300 RPM and the authors claim that at this speed, the mass transfer limitations are significantly reduced, and that the kinetic rate constants were measured after the mixture became homogeneous and are therefore intrinsic.

The reported rate constants for each reaction are tabulated below in TABLE 6. Here, the reaction network is considered to be serial, i.e., triglyceride (TG) to di-(DG) to mono-(MG) to glycerol (G). The surface rate constants were obtained by conversion from the homogeneous rate constants reported by Noureddini and Zhou (1997).

TABLE 6

Reaction Rate Constants For Biodiesel Reaction Network

| Reaction | Homogeneous rate constant (L/(mol-s)) | Surface rate constant ($m^6$/(mol-$m^2_{bubble}$-s)) |
|---|---|---|
| TG → DG | 0.05 | $7.569 \times 10^{-9}$ |
| DG → TG | 0.110 | $1.665 \times 10^{-8}$ |
| DG → MG | 0.215 | $3.255 \times 10^{-8}$ |
| MG → DG | 1.228 | $1.859 \times 10^{-7}$ |
| DG → G | 0.242 | $3.663 \times 10^{-8}$ |
| G → DG | 0.007 | $1.060 \times 10^{-9}$ |

The six reactions were then simulated as a set of ordinary differential equations in MATLAB and the time required for the weight fraction of FAME to increase to 60% by weight was calculated. This procedure can be repeated for every value of droplet radius in order to obtain a mapping of the time required for the transition to a homogeneous reaction as a function of the droplet radius. TABLE 7 sets forth the calculated times required for the two extreme droplet radii.

TABLE 7

Heterogeneous reaction time for different droplet radii

| Droplet radius (m) | Time (s) |
|---|---|
| $50 \times 10^{-9}$ | 0.003 |
| $10 \times 10^{-6}$ | 1.16 |

Of note, this model uses kinetic rate constants that were measured at 50° C. and at a catalyst concentration of 0.2% NaOH. If different temperatures or catalyst concentrations are to be used, then the rate constants must be adjusted accordingly.

From the results of the kinetic model and the hydrodynamics within the disclosed apparatus/system, the following conclusions are reached:

Due to the intense mixing in the interaction zone, small droplets of methanol are formed and dispersed in the soybean oil phase.

The very large interfacial area provided by these small droplets tremendously enhances the mass transfer rates, and the initial lag time is significantly reduced. The transition to the homogeneous reaction is hence accelerated.

Once the reaction becomes homogeneous, the reaction is limited by the solubility of methanol in the FAME-enriched vegetable oil phase. The glycerol has very low solubility in the oil phase and hence remains as a separate phase. Methanol partitions between the glycerol phase and the FAME-enriched oil phase.

The flow regime prevalent downstream from the microreactor is significantly different from the intense backmixing (as in a Continuous Flow Stirred Tank Reactor (CFSTR) emulator) at that point and approaches that of a system without further mixing in the flow direction (as in a Plug Flow Reactor (PFR) emulator). This behavior should help minimize droplet coalescing, thereby allowing continuous diffusion of glycerol to the droplets and methanol from the droplets into the oil phase until desired for downstream processing demands.

Based on the foregoing, it is believed that it would be possible to conduct a biodiesel reaction in two stages:

Initially, pass the mixture through a high shear device, so that there is significant interfacial area enhancement and the initial lag is reduced. The transition to homogeneous reaction can be achieved in a very short time in such a device Once the transition to the homogeneous reaction phase is accomplished, the mixture can be passed through a PFR so as to allow the reaction to proceed to its equilibrium conversion.

This hypothesis has been evaluated with reference to data reported in the literature [e.g., Costello, "Summary Tube in Tube (STT) Reactor," Kreider Laboratories, Camarillo, Calif. (2006), Zhou and Liang (2006), Boocock, et. al. (2000), Ma and Hanna (1999), and Noreddini and Zhou (1997)]. Indeed, the data in the literature clearly indicates mass action kinetics are in operation at "long times". Of note, the rate can be expected to drop off as conversion increases. Consequently, a continuous system should operate with maximum mixing early to eliminate/reduce mass transfer resistances, as in a CFSTR emulator, and to drive the reaction to completion in a PFR emulator, thereby eliminating the potential detrimental effects of back-mixing in the later stages of the reaction (i.e., at high conversions). Also, the transition from the heterogeneous to the homogeneous regime (60 wt % FAME) can be expected to occur more quickly, as compared to the lag phase reported in the literature, which is in the range of 20-30 minutes in current large commercial vessels. Such commercial systems typically only accomplish macro-mixing.

Process Intensification Systems:

The micro-mixing produced by process intensification (PI) reactors has been reported to dramatically overcome mass transfer issues, and thus increase reaction rates for biodiesel formation (Costello (2006)). Using a spinning tube in tube (STT) reactor, it is claimed that production is done at a residence time of 0.5 seconds due to the high shear field producing large interfacial areas. Furthermore, since the mass transfer is enhanced significantly, the glycerol formed in the FAME-oil phase is transported to the other phase quickly, resulting in improved product quality. It is further claimed that the FAME-oil phase retains less than 0.05% and thus less downstream processing is required.

These reported results support the concept that successful scale-up can be accomplished by holding shear constant. Consequently, any device that generates high shear will be effective in accomplishing favorable results. Exemplary systems include the Shockwave Power Reactor (HydroDynamics, Inc., Rome, Ga.), and in general all types of Spinning Disk Reactors, plus microchannel reactors (Velocys, Plain City, Ohio). The disclosed apparatus/systems also achieve desired high shear by utilizing microreactor designs/geometries to obtain micro-mixing time at scales of 1-4 µs. Residence times of 0.5-1 ms are obtained with the disclosed apparatus/system in the reaction chamber where energy dissipation rates readily form droplets in the 25-500 nm range.

The results set forth in the literature confirm that RPM is an important variable. Of note, due to insufficient data, energy modeling is not able to accurately predict the size of a methanol droplet. The predicted values are on order of 50 nm. In order to estimate how close this value is to the droplet sizes reported by others in the literature, a qualitative assessment was made by analyzing the phase separation time for a glycerol droplet in FAME and comparing such phase separation time to experimental observations. Several assumptions were made to facilitate this calculation:

1. The viscosity of the organic phase was that of pure FAME. In the experiment, the actual phase was a combination of methanol and FAME.
2. The height of the liquid in the sample jars from the experiments was on average 15 cm.
3. The droplets moved at the terminal velocity and did not coalesce. This assumption permits use of Stoke's Equation.

For a sphere with radius $R_p$ moving at its terminal velocity, Stoke's Equation gives:

$$6\pi\mu U R_p = V_p g \Delta\rho$$

where µ=viscosity of the continuous phase (µ=2.5E-3 kg/m/s for FAME); U=velocity of droplet [m/s]; $R_p$=radius of droplet ($R_p$=50 nm); $V_p$=volume of droplet ($V_p$=5.24E-22 m$^3$); g=gravity constant (g=9.81 m/s$^2$); and Δρ=difference in density between droplet and continuous phase [(1,280–880) kg/m$^3$=400 kg/m$^3$].

Solving for U:

$$U = \frac{V_p g \Delta\rho}{6\pi\mu R_p} = 2.8E\text{-}7 \text{ m/s}.$$

Solve for the settling time:

$$t = \frac{H}{U} = \frac{0.15 \text{ m}}{2.78E\text{-}7 \text{ m/s}} = 536,697 \text{ s} = 6.2 \text{ days}$$

Although this time represents the time required for droplets to move from the top to the bottom of the mixture and also ignores coalescence, it does provide useful data from an order of magnitude perspective and may be compared to actual observations and far exceeds actual data reported in the literature.

Example 5

Experiments to Determine Mass Transfer Characteristics and Parameters

The interfacial area in process intensification equipment can be quantified by performing mass transfer studies. In particular, a solute is introduced into the system of interest (e.g. methanol and soybean oil) and the mass transfer rate of this solute from one phase to the other is measured. The interfacial area can then be calculated. In order to accomplish this determination, it is necessary to have an estimate of the mass transfer coefficients in the individual phases—which can be determined through bench-top experiments.

Figure 21:
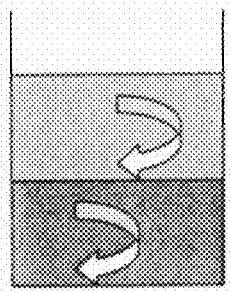
FIG. 21 is a schematic depiction of a system wherein two phases are simultaneously mixed.

Calculation of Mass Transfer Coefficients:

a) Continuous Mixing of Both Phases:

In the setup schematically depicted in FIG. 21, both the organic and aqueous phases are agitated to ensure back-mixing of both phases. From this experimental technique, the value of the overall mass transfer coefficient of the phase of interest can be obtained.

b) Mixing of One Phase:

With reference to FIGS. 22A and 22B, a set of two experiments may be conducted in which one phase is agitated, i.e., one phase is well mixed, and the other phase is maintained as a stagnant phase. This phase can hence be considered as a sheet and the diffusional length in this phase is the thickness of the phase.

By solving the partial differential equation for the gradient in the stagnant phase, the diffusion coefficient in that phase can be calculated. With the knowledge of the diffusion coefficient, the mass transfer coefficient for the phase can be obtained:

$$k_t = \frac{D_A}{\delta}$$

where $k_1$=mass transfer coefficient (m/s); $D_A$=diffusion coefficient for Phase A (m$^2$/s); and $\delta$=thickness of the stagnant layer (m).

The same procedure may then be repeated for the case where the stagnant/agitated phases are reversed (FIG. 22B). From this experiment, the mass transfer coefficient for the second phase can be obtained.

c) Verification of Mass Transfer Coefficients:

An experiment to verify the obtained mass transfer coefficients may then be performed. With reference to the schematic depiction of FIG. 23, both phases are stagnant and hence the diffusional length in both phases is known. By solving the partial differential equations for concentration simultaneously, the diffusion coefficient in each phase can be obtained. With this, the mass transfer coefficients can be obtained and compared with the values obtained in the previously described experiments. (See, generally, Crank, J., "The mathematics of diffusion", Oxford University Press, 1975; and Carslaw, H. S., Jaeger, J. C., "Conduction of heat in solids", Oxford University Press, 1959.)

Calculation of Interfacial Area:

Reactant systems may be processed in the disclosed apparatus/system and a measurement of inlet concentration of the solute is made. The system is run at different flow rates until the concentration at the outlet is equal to the equilibrium concentration. The residence time is measured for this run and, hence, the rate of mass transfer can be calculated. The interfacial area can then be obtained.

Data from two systems were obtained using this approach: (a) the soybean oil-MeOH system, and (b) the transfer of aspirin from an octanol phase to a water phase. In both cases, the estimated diffusion coefficients were in the range 1-5×10$^{-9}$ m$^2$/s and interfacial transfer coefficients as high as 0.5 m/s. Using these parameters and assuming it takes the entire residence time in the disclosed interaction/reaction chamber (0.5 to 1.0 ms) to reach equilibrium, droplet sizes (i.e., radius) in the range of 100-200 nm will be sufficient to accomplish the desired transfer amount.

Example 6

Production of Polymer Matrix/Chaperone Systems

Exemplary nanosized polymer particles were generated using two methods: (a) emulsion-evaporation, and (b) precipitation.

Emulsion Method

The emulsion method is a "top down" method that involves formation of a stable emulsion of a polymer/solvent solution with an immiscible non-solvent liquid and subsequent removal of the solvent. For some tests, an API (carbamazepine) was added to the solvent phase to be incorporated inside the polymer particles. A nano-emulsion was formed by first preparing a coarse emulsion with the solvent and aqueous streams using an IKA T-25 high shear mixer, then processing with a Microfluidizer® processor. The nanoemulsion size was controlled by varying the processing pressure, the number of passes and the concentration of the oil phase. The solvent was then removed from the emulsion, leaving only the polymer particles suspended in the water phase.

In an exemplary application, poly(lactic-co-glycolic acid) (PLGA) particles were formed. The polymer was dissolved in dichloromethane (DCM) at concentrations between 10 and 80 mg/ml. The solution was then mixed at concentrations of 1-10% dichloromethane with water that contained poly(vinyl alcohol) (PVA) to form a coarse emulsion. The processing pressure was varied between 70 and 140 Mpa and some material was subjected to multiple passes. All tests were performed on a M-110EH Microfluidizer® processor with a F20Y (75 μm)-H30Z (200 μm) chamber configuration.

The solvent was then removed using several different methods that have different driving forces to obtain particles with different sizes. An evaporation method was performed in a "rotovap" at 25 kPa absolute for 10-20 minutes, depending on the concentration of the dichloromethane. The temperature of the sample was maintained at room temperature using a water bath. A co-solvent extraction method was performed by mixing the emulsion with a co-solvent immediately after processing. The co-solvent does not dissolve the polymer, but is miscible with the water phase and organic phase.

Precipitation Method

The precipitation method is a "bottom up" process that involves precipitation of polymer from a solution by adding a polymer/solvent/(API) solution to a miscible anti-solvent. Addition of the anti-solvent causes the polymer to become supersaturated and precipitate out. These streams were mixed inside an interaction chamber at various shear rates by controlling the orifice size and processing pressure.

A surfactant was added to the anti-solvent (water) in order to: (a) to stabilize the nanoparticles and limit their growth, and (b) to minimize agglomeration of the particles and thereby create a stable suspension. A non-ionic surfactant was used, Solutol® HS 15 (polyoxyethylene esters of 12-hydroxystearic acid; Bayer).

Nanosuspensions of two different polymers, poly(epsilon-caprolactone) (PCL) and poly(D,L-lactide-co-glycolide) (PLGA) were produced using the precipitation method. These polymers were dissolved in acetone at concentrations ranging from 10 mg/ml to 40 mg/ml. These solutions were mixed with water that contains a surfactant with flow ratios in the range of 1:2-1:10. Process pressures were varied between 35-140 mPa.

Drug Encapsulation

To date, there have been only qualitative measurements of the amount of drug that was encapsulated within the polymer nanoparticles during the foregoing tests. A qualitative test was performed by performing two replicate tests, both with the same concentrations of API, one with the polymer and one without polymer. These samples were analyzed using optical microscopy to identify any large drug particulates.

Particle Size Analysis

The particle size distribution of these samples was measured using a Malvern Zetasizer® instrument which uses dynamic light scattering. The samples were measured at 25° C. with water as the continuous phase and PLGA as the particle phase. The reported results are the Z-Average, which is a volume weighted average.

Electron Microscopy

Two different electron microscopy techniques were employed. The emulsion evaporation samples were analyzed using a transmission electron microscope (TEM) (Model JEOL, JEM 1010 TEM) operated at 60 kV. A staining material was used to increase the contrast of the particles. The samples prepared using the precipitation technique were analyzed using a scanning electron (SEM) (Hitachi S-4800 FESEM).

Light Microscopy

To determine if the API was encapsulated within the polymer particles, the samples were analyzed using a light microscope. Although light microscopy is not able to achieve resolution at the nanoparticle scale, it is powerful enough to see preliminarily whether the API has been encapsulated.

Results

Results from the processing of the polymer nano-particles using the emulsion method are set forth in Table 8.

TABLE 8

| # | C PLGA (mg/ml) | % DCM | Pressure (MPa) | # of Passes | Evap. (nm) | Co-Solvent (nm) |
|---|---|---|---|---|---|---|
| 1 | 10 | 5 | 70 | 1 | 223 | 129 |
| 2 | 10 | 5 | 70 | 2 | 100 | 76 |
| 3 | 10 | 5 | 70 | 3 | 114 | 99 |
| 4 | 10 | 1 | 70 | 1 | 3254 | 124 |
| 5 | 10 | 10 | 70 | 1 | 168 | 116 |
| 6 | 10 | 5 | 105 | 1 | 127 | 84 |
| 7 | 10 | 5 | 140 | 1 | 140 | 149 |
| 8 | 40 | 5 | 70 | 1 | 193 | 146 |
| 9 | 80 | 5 | 70 | 1 | 168 | 119 |

All of the emulsion tests were performed with 1% PVA dissolved in the water phase to stabilize the emulsion. The concentration of the PLGA in the DCM is designated as "C PLGA." The amount of oil phase that is mixed with the water phase is shown as "% DCM." The processing pressure is shown as "Pressure." The Z-average particle size for the two different solvent removal techniques are shown as "Evap." for the solvent evaporation technique and "Co-Solvent" for the co-solvent extraction technique.

Figure 24:
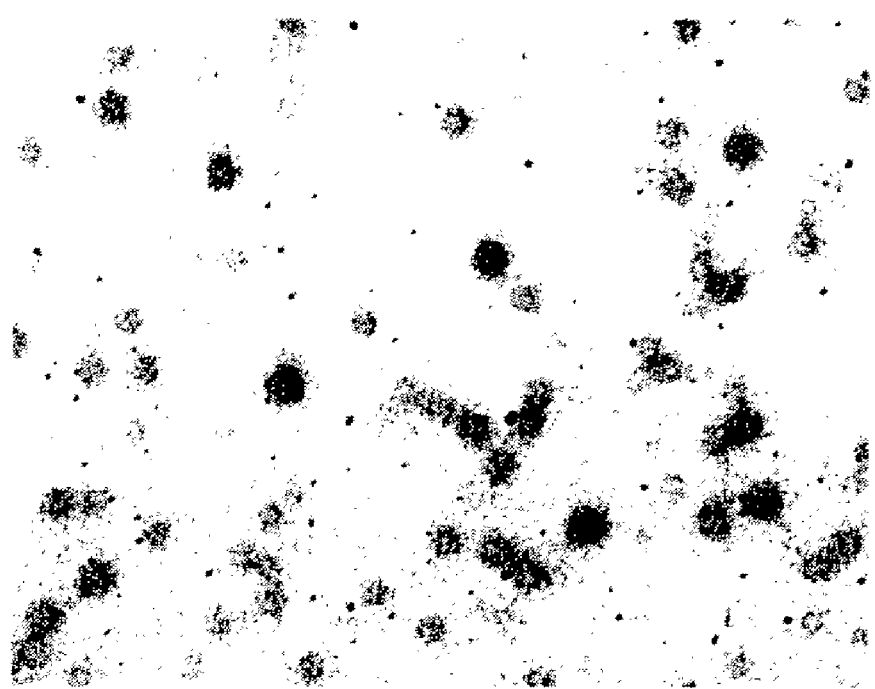
FIG. 24 is a TEM image of polymer nanoparticles generated according to an exemplary implementation of the present disclosure.

FIG. 24 is a TEM image of particles formed using the emulsion method (sample #9). The black specks that are shown in the image are identified as the contrast agent, phosphotungstic acid, which was used to enhance imaging.

Results from the processing of the polymer nanoparticles using the precipitation method are set forth in Table 9.

TABLE 9

| # | Polymer | % Acetone | C Poly. (mg/ml) | Shear ($s^{-1}$ × $10^6$) | Z-ave. (nm) |
|---|---|---|---|---|---|
| 1 | PCL | 10 | 20 | 1.2 | 445 |
| 2 | PCL | 10 | 20 | 1.2 | 517 |
| 3 | PCL | 10 | 20 | 6.0 | 281 |
| 4 | PCL | 10 | 40 | 6.0 | 341 |
| 5 | PCL | 10 | 10 | 6.0 | 258 |
| 6 | PCL | 10 | 20 | 6.8 | 280 |
| 7 | PLGA | 10 | 20 | 6.0 | 230 |
| 8 | PLGA | 9 | 10 | 6.8 | 184 |
| 9 | PLGA | 17 | 10 | 6.8 | 173 |
| 10 | PLGA | 25 | 10 | 6.8 | 177 |
| 11 | PLGA | 33 | 10 | 6.8 | 212 |

Figure 25:
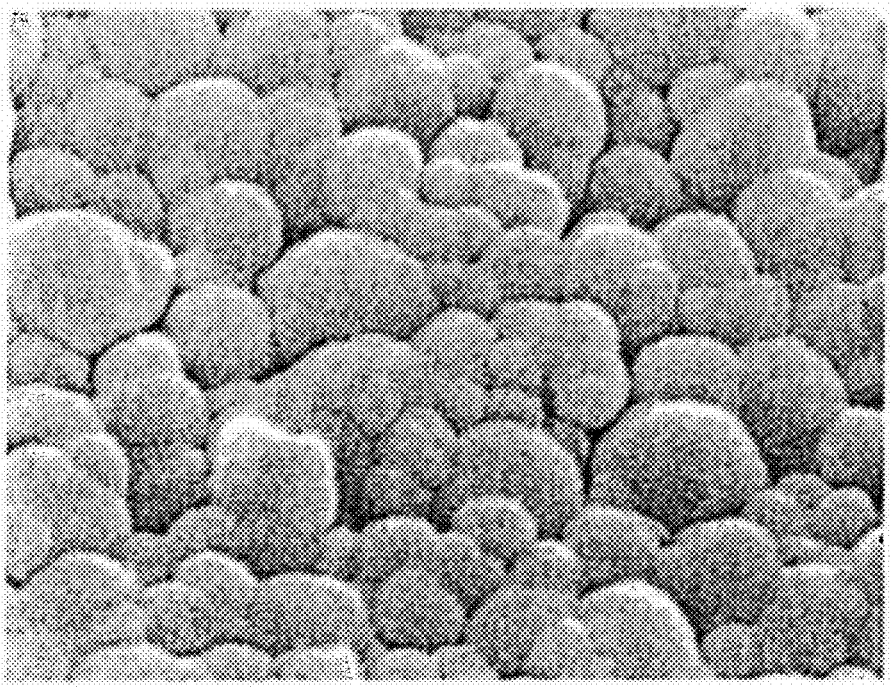
FIG. 25 is an SEM image polymer nanoparticles generated according to an exemplary implementation of the present disclosure.

All of the precipitation tests were performed with 1% Solutol dissolved in the water phase to stabilize the dispersion. The type of polymer used is labeled as "Polymer." The concentration of the polymer in the acetone is labeled as "C Poly." The amount of acetone that is mixed with the water phase is labeled as "% acetone." The shear rate, which is a function of pressure and orifice size, is labeled as "Shear." The Z-average particle size is labeled as "Z-ave." FIG. 25 is an SEM image of particles formed via the precipitation method (sample #3).

Drug Encapsulation

Figure 26A:
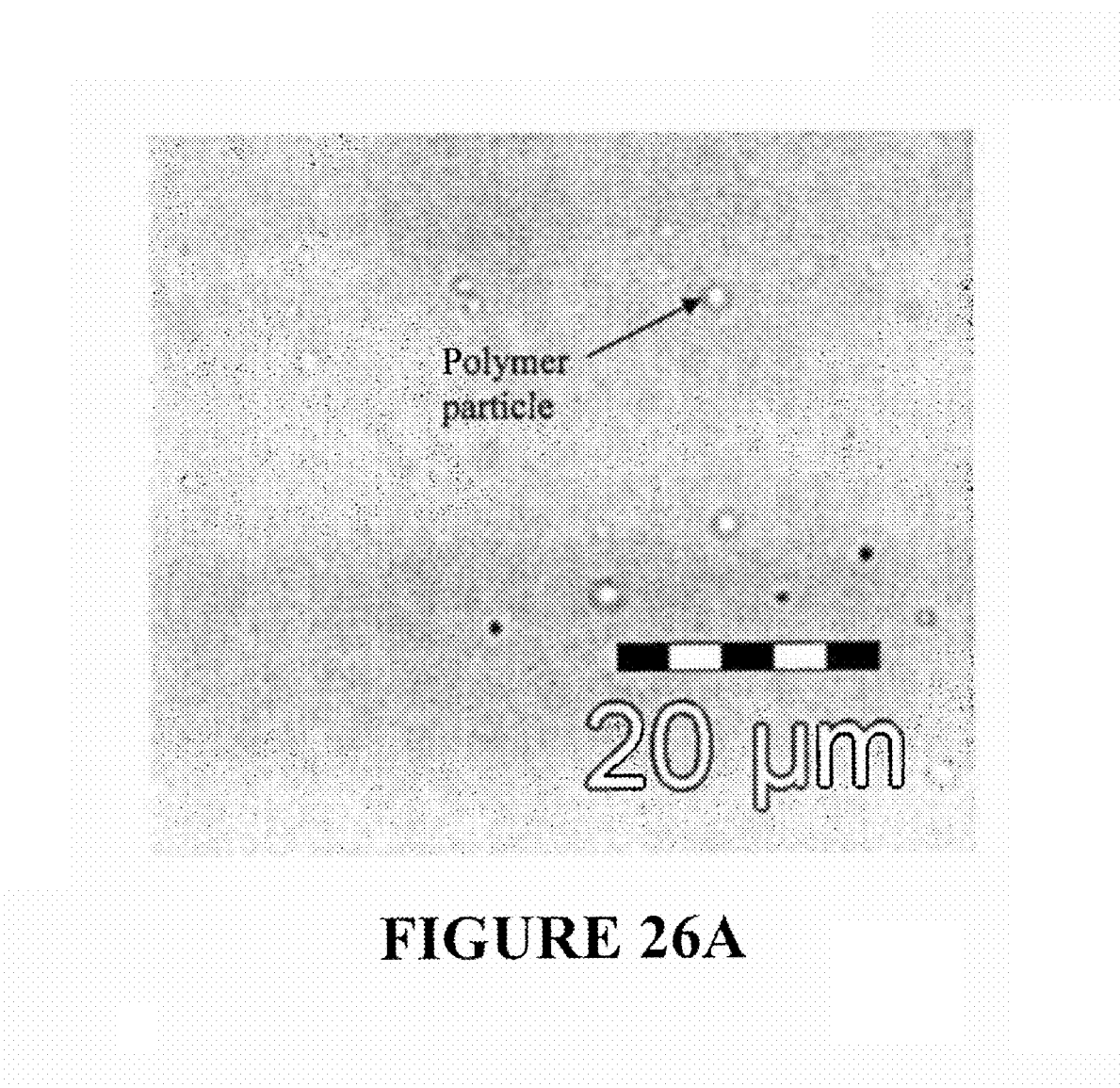
FIGS. 26A and 26B are optical microscope images that included polymer and API (FIG. 26A) and API only (FIG. 26B).
Figure 26B:
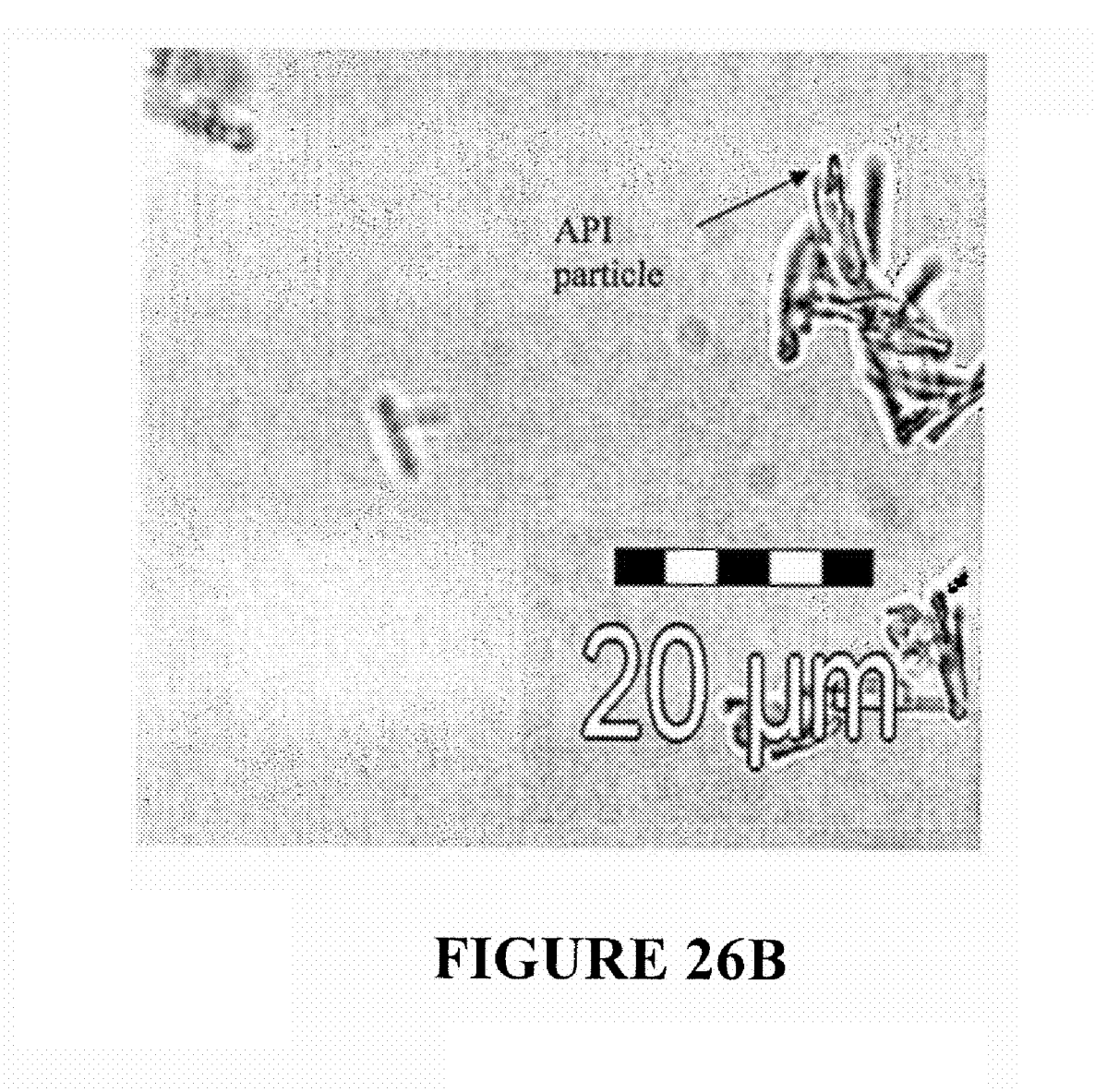

Optical microscope images for drug encapsulation tests conducted herein are set forth in FIGS. 26A and 26B. The samples used to generate these images were prepared under the conditions set forth in test #10 of the precipitation method. FIG. 26A reflects a precipitation test run with both polymer and API, whereas FIG. 26B reflects a test run with API alone. The absence of API particles from the image of FIG. 26A indicates that the drug is encapsulated within the polymer, as opposed to the free crystalline form of the API particle shown in FIG. 26B.

Conclusions

Polymer nanosuspensions in the range of 50-500 nm with two different polymers were successfully processed using both emulsion and the precipitation methods as described herein. By controlling the processing parameters, nanosuspensions with various polymer sizes and densities were created.

For the emulsion method, the dispersions that were prepared by co-solvent extraction were, in general, smaller than those prepared by the evaporation method. This may be due to the stability of the emulsion after processing and/or agglomeration of the particles either during the drying process or after drying. The co-solvent extraction process was performed immediately after processing. Some time (5-30 min.) elapsed before the evaporation technique was performed which may have enabled the emulsions to ripen.

By varying the process pressure (70-140 Mpa) and number of passes (1-3), the size of the polymer particles varied in the range of 75-250 nm. Given a desired formulation, the particle size of the dispersion may be controlled by selecting appropriate processing conditions. Based on the images provided herein, encapsulation of the API within the polymer nanoparticles appears to have been successfully achieved through the disclosed techniques.

Although the present disclosure has been described with reference to exemplary embodiments and implementations thereof, the present disclosure is not limited by such illustrative embodiments/implementations. Rather, the present disclosure is subject to changes, modifications, enhancements and/or variations with departing from the spirit or scope hereof. Indeed, the present disclosure expressly encompasses all such changes, modifications, enhancements and variations within its scope.

The invention claimed is:

1. A method for processing at least two liquid feed streams, comprising:
   a. feeding first and second constituents to one or more intensifier pumps at different individually actively controlled rates such that interaction between the first and second constituents is substantially prevented prior to pressurization within the one or more intensifier pumps;
   b. pressurizing the first and second constituents in a combined stream within the one or more intensifier pumps to an elevated pressure of at least 35 MPa;
   c. delivering the combined stream to a microreactor downstream from the one or more intensifier pumps, the microreactor having a minimum channel dimension of 150 microns or less, causing the first and second constituents to interact within the microreactor at a nanoscale level.

2. The method of claim 1, wherein the first and second constituents are fed to the one or more intensifier pumps in feed lines that are coaxially aligned.

3. The method of claim 1, wherein the first and second constituents are introduced to the one or more intensifier pumps through spaced ports defined by the one or more intensifier pumps.

4. The method according to claim 1, wherein the first and second constituents are fed to the at least one intensifier pump through a first feed line and a second feed line that is coaxially positioned within the first feed line so as to prevent substantial mixing of the first and second constituents prior to pressurization by the at least one intensifier pump.

5. The method of claim 1, further comprising recycling at least a portion of effluent from the microreactor to the one or more intensifier pumps.

6. The method of claim 1, wherein the different individually actively controlled rates for delivery of the first and second constituents to the one or more intensifier pumps are effected by individually actively controlled feed pumps for the first and second constituents.

7. The method of claim 1, wherein the different individually actively controlled rates are effective to control the ratio of first constituent to second constituent fed to the one or more intensifier pumps.

8. The method of claim 1, further comprising cooling or quenching the combined stream after interaction within the microreactor.

9. The method of claim 1, wherein the first constituent includes a solvent, and wherein the second constituent includes an antisolvent, and wherein interaction of the solvent and the antisolvent in the microreactor is effective to define a nanosuspension, the method further comprising:
   obtaining constituent nanoparticle crystals from the nanosuspension.

10. The method of claim 9, wherein the solvent stream is selected from the group consisting of dimethyl sulfoxide (DMSO), N-Methyl-2-Purrolidone (NMP), methanol, ethanol, acetone, dichloromethane, octanol and isopropyl alcohol, and the antisolvent stream is selected from the group consisting of water, hexane and heptane.

11. The method of claim 10, wherein the solvent stream is DMSO and nanoparticles of azithromycin are obtained at a median particle size of about 50-100 nm.

12. The method of claim 10, wherein the solvent stream is DMSO and nanoparticles of oxycarbazepine are obtained at a median particle size less than 1000 nm.

13. The method of claim 10, wherein the solvent stream is DMSO or NMP and nanoparticles of loratadine are obtained at a median particle size of less than 500 nm.

14. The method of claim 9, further comprising cooling or quenching the nanosuspension after interaction within the microreactor.

15. The method of claim 1, wherein the first constituent is a first reactant and the second constituent is a second reactant, the method further comprising:
   adjusting reaction selectivity by controlling interaction between the first and second reactants prior to the nanoscale level interaction within the microreactor.

16. The method of claim 15, wherein control of the interaction between the first and second reactants is effected by limiting contact between the first and second reactants prior to pressurization in the at least one intensifier pump.

17. The method of claim 15, wherein the first and second reactants are delivered to the at least one intensifier pump through spaced ports defined by the at least one intensifier pump.

18. The method of claim 15, further comprising cooling or quenching the first and second reactants after interaction within the microreactor.

19. The method of claim 15, wherein the first and second reactants react at an accelerated rate due to enhanced surface interaction between the first and second reactants within the microreactor.

20. The method of claim 19, further comprising cooling or quenching the first and second reactants after reaction within the microreactor.

21. The method of claim 1, wherein interaction of the first and second constituents in the microreactor produces polymorphs, and wherein polymorph production is controlled through control of operational-parameters associated with the microreactor.

22. The method of claim 21, wherein the operational parameters are selected from the group consisting of microreactor design, microreactor geometry, pressure generated by the intensifier pump, supersaturation ratio, solvents, antisolvents, temperature and combinations thereof.

23. The method of claim 21, further comprising cooling or quenching the first and second streams after interaction within the microreactor.

24. The method of claim 1, wherein the elevated pressure is at least about 70 MPa.

25. The method of claim 1, wherein the elevated pressure is at least about 140 MPa.

26. The method of claim 1, wherein the elevated pressure is at least about 207 MPa.

27. The method of claim 1, wherein the ratio of the flow rate of the second stream to the flow rate of the first stream is at least about 2:1.

28. The method of claim 1, wherein the ratio of the flow rate of the second stream to the flow rate of the first stream is at least about 3:1.

29. The system of claim 1, wherein the ratio of the flow rate of the second stream to the flow rate of the first stream is at least about 10:1.

30. The method of claim 1, wherein the microreactor has channels with minimum dimensions in the range of 75-150 microns.

31. The method of claim 1, wherein the average fluid velocity in microreactor channels is in the range of 300-500 m/s.

32. The method of claim 1, further comprising: effecting a sheer rate in the microreactor of at least about $1.2 \times 10^6$ $s^{-1}$.

33. The method of claim 1, further comprising: controlling the first controlled rate with respect to the second controlled rate.

34. The method of claim 1, wherein the microreactor has a multi-slot geometry.

35. The method of claim 1, wherein the first and second feed streams enter the microreactor as impinging jets.

36. The method of claim 1, wherein at least one of the liquid feed streams includes solid particles.

37. The method of claim 9, wherein at least one of the feed streams contains seed particles.

38. The method of claim 9, wherein at least one of the feed streams contains catalyst particles.

39. The method of claim 15, wherein at least one of the feed streams contains seed particles.

40. The method of claim 15, wherein at least one of the feed streams contains catalyst particles.

41. The method of claim 15, wherein at least one of the reactants is a solid.

* * * * *